(12) United States Patent
Lee et al.

(10) Patent No.: US 10,469,149 B2
(45) Date of Patent: Nov. 5, 2019

(54) BEAM SCANNING METHOD USING CODEBOOK IN WIRELESS COMMUNICATION SYSTEM

(71) Applicant: LG ELECTRONICS INC., Seoul (KR)

(72) Inventors: Kilbom Lee, Seoul (KR); Jiwon Kang, Seoul (KR); Kitae Kim, Seoul (KR); Kungmin Park, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/753,536

(22) PCT Filed: Jul. 29, 2016

(86) PCT No.: PCT/KR2016/008359
§ 371 (c)(1),
(2) Date: Feb. 19, 2018

(87) PCT Pub. No.: WO2017/030300
PCT Pub. Date: Feb. 23, 2017

(65) Prior Publication Data
US 2018/0241457 A1    Aug. 23, 2018

Related U.S. Application Data

(60) Provisional application No. 62/206,308, filed on Aug. 18, 2015.

(51) Int. Cl.
*H04B 7/06* (2006.01)
*H04J 11/00* (2006.01)
(Continued)

(52) U.S. Cl.
CPC .......... *H04B 7/0639* (2013.01); *H04B 7/06* (2013.01); *H04B 7/0617* (2013.01);
(Continued)

(58) Field of Classification Search
CPC .......... H04W 56/0015; H04W 76/11; H04B 7/0639; H04B 7/0617
(Continued)

(56) References Cited

U.S. PATENT DOCUMENTS

| | | | |
|---|---|---|---|
| 2013/0064239 A1 | 3/2013 | Yu et al. | |
| 2013/0148759 A1* | 6/2013 | Tee | H04B 7/0695 375/296 |

(Continued)

FOREIGN PATENT DOCUMENTS

| | | |
|---|---|---|
| KR | 1020080033055 | 4/2008 |
| KR | 1020130118249 | 10/2013 |

(Continued)

OTHER PUBLICATIONS

PCT International Application No. PCT/KR2016/008359, Written Opinion of the International Searching Authority dated Oct. 21, 2016, 18 pages.

*Primary Examiner* — Jae Y Lee
*Assistant Examiner* — Jean F Voltaire
(74) *Attorney, Agent, or Firm* — Lee Hong Degerman Kang Waimey

(57) ABSTRACT

Disclosed are a beam scanning method and a base station, the method in which generated is a code book comprising a plurality of second precoders, defined by the weighted sums of a plurality of first precoders, and in which a plurality of synchronization signals, to which applied are second precoders that are selected from the code book and differ from each other, are transmitted to a terminal over a plurality of time intervals. The synchronization signals are used in (Continued)

synchronization, beam scanning and cell ID acquisition of the terminal, and each weighted sum applied to the plurality of first precoders indicates a beam ID used in the beam scanning.

12 Claims, 16 Drawing Sheets

(51) Int. Cl.
    *H04W 76/11*     (2018.01)
    *H04W 56/00*     (2009.01)

(52) U.S. Cl.
    CPC ............ *H04B 7/0695* (2013.01); *H04J 11/00* (2013.01); *H04W 56/0015* (2013.01); *H04W 76/11* (2018.02)

(58) Field of Classification Search
    USPC .......................................................... 370/252
    See application file for complete search history.

(56) References Cited

U.S. PATENT DOCUMENTS

| | | | |
|---|---|---|---|
| 2013/0229309 A1* | 9/2013 | Thomas | H04B 7/0478 342/377 |
| 2016/0028519 A1* | 1/2016 | Wei | H04B 7/0456 375/267 |
| 2016/0127919 A1* | 5/2016 | Hui | H04W 16/28 342/371 |
| 2016/0198474 A1* | 7/2016 | Raghavan | H04W 72/0466 370/335 |

FOREIGN PATENT DOCUMENTS

| | | |
|---|---|---|
| KR | 1020150072875 | 6/2015 |
| WO | 2015080649 | 6/2015 |

\* cited by examiner (a)  (b)

(a)  (b)

(a)　　　　　　　　　　　　(b)

(a)            (b)

BEAM SCANNING METHOD USING CODEBOOK IN WIRELESS COMMUNICATION SYSTEM

CROSS-REFERENCE TO RELATED APPLICATIONS

This application is the National Stage filing under 35 U.S.C. 371 of International Application No. PCT/KR2016/008359, filed on Jul. 29, 2016, which claims the benefit of U.S. Provisional Application No. 62/206,308, filed on Aug. 18, 2015, the contents of which are all hereby incorporated by reference herein in their entirety.

TECHNICAL FIELD

Following description relates to a wireless communication system, and more particularly, to a method of performing beam scanning using a codebook for a synchronization signal in a wireless LAN system and an apparatus therefor.

BACKGROUND ART

An ultrahigh frequency wireless communication system based on mmWave is configured to operate at a center frequency of several GHz to several tens of GHz. Due to the characteristic of the center frequency, a pathloss may considerably occurs in a radio shadow area. Since it is necessary to stably transmit a synchronization signal to all terminals belonging to the coverage of a base station, it is necessary to design and transmit a synchronization signal in consideration of a potential deep-null phenomenon capable of being occurred due to the characteristic of the ultrahigh frequency band in the mmWave communication system.

DISCLOSURE OF THE INVENTION

Technical Problems

The present invention is directed to solve the aforementioned problem. An object of the present invention is to reduce calculation complexity of a UE by simplifying a beam scanning procedure between a base station and the UE in a wireless communication system.

Another object of the present invention is to improve a beam scanning procedure by proposing a codebook for a synchronization signal.

The other object of the present invention is to minimize additional signaling load of a UE while complexity of the UE is improved.

The technical problems solved by the present invention are not limited to the above technical problems and other technical problems which are not described herein will become apparent to those skilled in the art from the following description.

Technical Solution

To achieve these and other advantages and in accordance with the purpose of the present invention, as embodied and broadly described, according to one embodiment, a method of performing beam scanning, which is performed by a base station with a user equipment (UE) in a wireless communication system, includes the steps of generating a codebook consisting of a plurality of second precoders defined by weighted sums of a plurality of first precoders, and transmitting a plurality of synchronization signals to which second precoders different from each other selected from the codebook are applied to the UE over a plurality of time intervals. In this case, the synchronization signals are used for a synchronization procedure, a beam scanning procedure, and a cell ID acquisition procedure of the UE and each of the weighted sums applied to a plurality of the first precoders may correspond to a beam ID utilized for the beam scanning procedure.

Weighted sum vectors applied to a plurality of the first precoders may be orthogonal to each other.

The weighted sum vectors can be generated based on a Hadamard matrix or a DFT (Discrete Fourier Transform) matrix.

The codebook is shared between the base station and the UE and the number of a plurality of the second precoders constructing the codebook may be identical to the number of repeatedly transmitting a synchronization signal transmitted by the base station.

The beam scanning procedure can be performed using a correlation value calculated in the synchronization procedure.

The beam scanning procedure can be performed while a sequence for beam scanning is not separately allocated.

To further achieve these and other advantages and in accordance with the purpose of the present invention, according to a different embodiment, a base station performing beam scanning with a user equipment (UE) in a wireless communication system includes a transmitter, a receiver, and a processor configured to operate in a manner of being connected with the transmitter and the receiver, the processor configured to generate a codebook consisting of a plurality of second precoders defined by weighted sums of a plurality of first precoders, the processor configured to transmit a plurality of synchronization signals to which second precoders different from each other selected from the codebook are applied to the UE over a plurality of time intervals. In this case, the synchronization signals are used for a synchronization procedure, a beam scanning procedure, and a cell ID acquisition procedure of the UE and each of the weighted sums applied to a plurality of the first precoders may correspond to a beam ID utilized for the beam scanning procedure.

Advantageous Effects

According to embodiments of the present invention, the following effects are expected.

First of all, it is able to reduce calculation complexity of a UE by simplifying a beam scanning procedure between a base station and the UE in a wireless communication system.

Second, since a beam scanning procedure is improved by improving a codebook for a synchronization signal, it is able to reduce a sequence allocation burden for performing beam scanning.

Third, it is able to minimize the increase of signaling load of a UE while complexity of the UE is improved.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE

Mode for Invention

Figure 1:
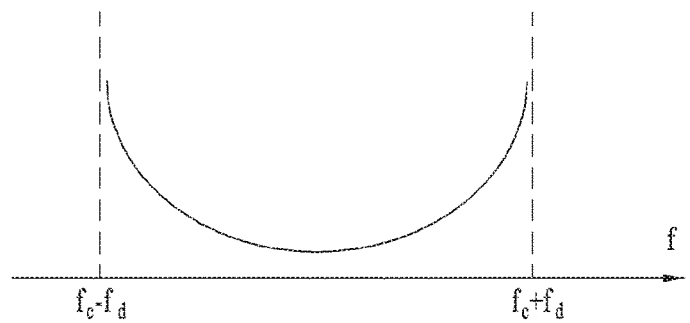
FIG. 1 is a diagram illustrating a Doppler spectrum.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. Communication System Using Ultrahigh Frequency Band

In an LTE (Long Term Evolution)/LTE-A (LTE Advanced) system, an error value of oscillators between a UE and an eNB is defined by requirements as follows.

UE side frequency error (in TS 36.101)

The UE modulated carrier frequency shall be accurate to within ±0.1 PPM observed over a period of one time slot (0.5 ms) compared to the carrier frequency received from the E-UTRA Node B eNB side frequency error (in TS 36.104)

Frequency error is the measure of the difference between the actual BS transmit frequency and the assigned frequency.

Meanwhile, oscillator accuracy according to types of BS is as listed in Table 1 below.

TABLE 1

| BS class | Accuracy |
| --- | --- |
| Wide Area BS | ±0.05 ppm |
| Local Area BS | ±0.1 ppm |
| Home BS | ±0.25 ppm |

Therefore, a maximum difference in oscillators between a BS and a UE is ±0.1 ppm, and when an error occurs in one direction, an offset value of maximum 0.2 ppm may occur. This offset value is converted to a unit of Hz suitable for each center frequency by being multiplied by the center frequency.

Meanwhile, in an OFDM system, a CFO value is varied depending on a subcarrier spacing. Generally, the OFDM system of which subcarrier spacing is sufficiently great is relatively less affected by even a great CFO value. Therefore, an actual CFO value (absolute value) needs to be expressed as a relative value that affects the OFDM system. This will be referred to as normalized CFO. The normalized CFO is expressed as a value obtained by dividing the CFO value by the subcarrier spacing. The following Table 2 illustrates CFO of an error value of each center frequency and oscillator and normalized CFO.

TABLE 2

| Center frequency (subcarrier spacing) | Oscillator Offset | | | |
| --- | --- | --- | --- | --- |
| | ±0.05 ppm | ±0.1 ppm | ±10 ppm | ±20 ppm |
| 2 GHz (15 kHz) | ±100 Hz (±0.0067) | ±200 Hz (±0.0133) | ±20 kHz (±1.3) | ±40 kHz (±2.7) |
| 30 GHz (104.25 kHz) | ±1.5 kHz (±0.014) | ±3 kHz (±0.029) | ±300 kHz (±2.9) | ±600 kHz (±5.8) |
| 60 GHz (104.25 kHz) | ±3 kHz (±0.029) | ±6 kHz (±0.058) | ±600 kHz (±5.8) | ±1.2 MHz (±11.5) |

In Table 2, it is assumed that a subcarrier spacing is 15 kHz when the center frequency is 2 GHz (for example, LTE Rel-8/9/10). When the center frequency is 30 GHz or 60 GHz, a subcarrier spacing of 104.25 kHz is used, whereby throughput degradation is avoided considering Doppler effect for each center frequency. The above Table 2 is a simple example, and it will be apparent that another subcarrier spacing may be used for the center frequency.

Meanwhile, Doppler spread occurs significantly in a state that a UE moves at high speed or moves at a high frequency band. Doppler spread causes spread in a frequency domain, whereby distortion of a received signal is generated in view of the receiver. Doppler spread may be expressed as $f_{doppler} = (v/\lambda)\cos\theta$. At this time, v is a moving speed of the UE, and $\lambda$ means a wavelength of a center frequency of a radio wave which is transmitted. $\theta$ means an angle between the radio wave and a moving direction of the UE. Hereinafter, description will be given on the assumption that $\theta$ is 0.

At this time, a coherence time is inverse proportion to Doppler spread. If the coherence time is defined as a time spacing of which correlation value of a channel response in a time domain is 50% or more, the coherence time is expressed as $$T_c \approx \frac{9}{16\pi f_{doppler}}.$$

In the wireless communication system, the following Equation 1 which indicates a geometric mean between an equation for Doppler spread and an equation for the coherence time is used mainly.

$$T_c = \sqrt{\frac{9}{16\pi f_{doppler}}} = \frac{0.423}{f_{doppler}} \quad [\text{Equation 1}]$$

FIG. 1 is a diagram illustrating a Doppler spectrum.

A Doppler spectrum or Doppler power spectrum density, which indicates a change of a Doppler value according to a frequency change, may have various shapes depending on a communication environment. Generally, in an environment, such as downtown area, where scattering occurs frequently, if received signals are received at the same power in all directions, the Doppler spectrum is indicated in the form of U-shape as shown in FIG. 1. FIG. 1 shows a U-shaped Doppler spectrum when the center frequency is $f_c$ and a maximum Doppler spread value is $f_d$.

Figure 2:
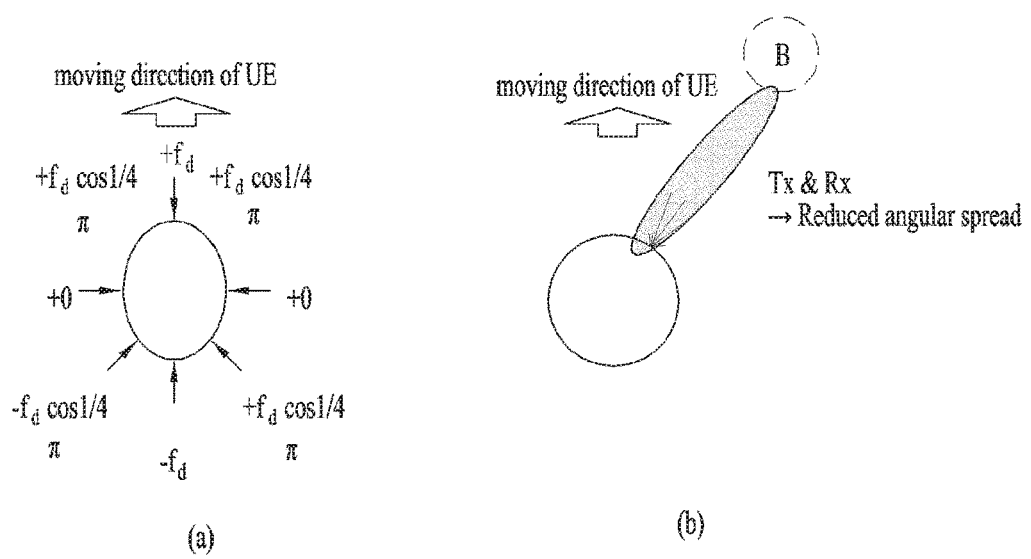
FIG. 2 is a diagram illustrating narrow beamforming related to the present invention.
Figure 3:
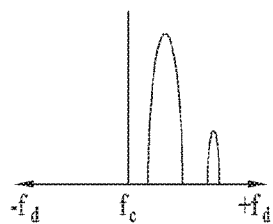
FIG. 3 is a diagram illustrating a Doppler spectrum when narrow beamforming is performed.

FIG. 2 is a diagram illustrating narrow beamforming related to the present invention, and FIG. 3 is a diagram illustrating a Doppler spectrum when narrow beamforming is performed.

In the ultrahigh frequency wireless communication system, since the center frequency is located at a very high band, a size of an antenna is small and an antenna array comprised of a plurality of antennas may be installed in a small space. This characteristic enables pin-point beamforming, pencil beamforming, narrow beamforming, or sharp beamforming, which is based on several tens of antennas to several hundreds of antennas. This narrow beamforming means that a received signal is received at a certain angle only not a constant direction.

FIG. 2(a) illustrates that a Doppler spectrum is represented in the form of U-shape depending on a signal received in a constant direction, and FIG. 2(b) illustrates that narrow beamforming based on a plurality of antennas is performed.

As described above, if narrow beamforming is performed, the Doppler spectrum is represented to be narrower than U-shape due to reduced angular spread. As shown in FIG. 3, it is noted from the Doppler spectrum when narrow beamforming is performed that Doppler spread is generated at a certain band only.

The aforementioned wireless communication system using the ultrahigh frequency band operates on a band having a center frequency ranging from several GHz to several tens of GHz. The characteristics of such a center frequency further worsen Doppler Effect generated from migration of a user equipment or influence of CFO due to an oscillator difference between a transmitter and a receiver.

Figure 4:
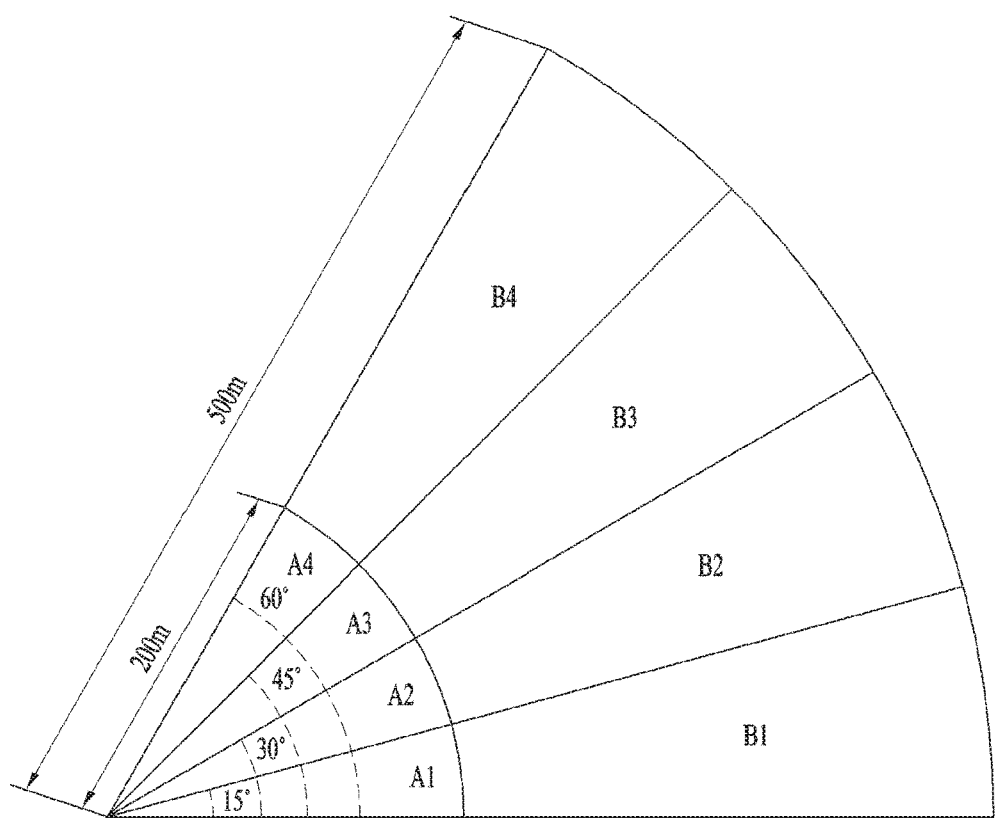
FIG. 4 is a diagram showing an example of a synchronization signal service area of a base station.

FIG. 4 is a diagram showing an example of a synchronization signal service area of a base station.

A user equipment (hereinafter abbreviated UE) performs synchronization with a base station using a downlink (DL) synchronization signal transmitted by the base station. In such a synchronization process, timing and frequency are synchronized between the base station and the UE. In order to enable UEs in a specific cell to receive and use a synchronization signal in a synchronization process, the base station transmits the synchronization signal by configuring a beam width as wide as possible.

Meanwhile, in case of an mmWave communication system that uses a high frequency band, a path loss in synchronization signal transmission appears greater than that of a case of using a low frequency band. Namely, a system using a high frequency band has a supportable cell radius reduced more than that of a related art cellular system (e.g., LTE/LTE-A) using a relatively low frequency band (e.g., 6 GHz or less).

As a method for solving the reduction of the cell radius, a synchronization signal transmitting method using a beamforming may be used. Although a cell radius increases in case of using a beamforming, a beam width is reduced disadvantageously. Equation 2 shows variation of a received signal SINR according to a beam width.

$$W \to M^{-2} W$$

$$SINR \to M^2 SINR \qquad \text{[Equation 2]}$$

If a beam width is reduced by $M^{-2}$ time according to a beamforming, Equation 2 indicates that a received SINR is improved by $M^2$ times.

Beside such a beamforming scheme, as another method for solving the cell radius reduction, it is able to consider a scheme of transmitting a same synchronization signal repeatedly. In case of such a scheme, although an addition resource allocation is necessary or a time axis, a cell radius can be advantageously increased without a decrease of a beam width.

Meanwhile, a base station allocates a resource to each UE by scheduling a frequency resource and a time resource located in a specific section. In the following, such a specific section shall be defined as a sector. In the sector shown in FIG. 4, A1, A2, A3 and A4 indicate sectors having widths of 0~15', 15~30', 30~45' and 45~60' in radius of 0~200 m, respectively. B1, B2, B3 and B4 indicate sectors having widths of 0~15', 15~30', 30~45' and 45~60' in radius of 200~500 m, respectively. Based on the substance shown in FIG. 4, sector 1 is defined as {A1, A2, A3, A4} and sector 2 is defined as {A1, A2, A3, A4, B1, B2, B3, B4}. Moreover, if a current synchronization signal service area of a base station is the sector 1, in order for the base station to service a synchronization signal for the sector 2, assume that an additional power over 6 dB is required for a transmission of a synchronization signal.

First of all, in order to service the sector 2, the base station can obtain an additional gain of 6 dB using a beamforming scheme. Through such a beamforming process, a service radius can be extended from A1 to B1. Yet, since a beam width is reduced through the beamforming, A2 to A3 cannot be serviced simultaneously. Hence, when a beamforming is performed, a synchronization signal should be sent to each of the A2~B2, A3~B3, and A4~B4 sectors separately. So to speak, in order to service the sector 2, the base station should transmit the synchronization signal by performing the beamforming four times.

On the other hand, considering the aforementioned repetitive transmission of the synchronization signal, the base station may be able to transmit the synchronization signal to the whole sector 2. Yet, the synchronization signal should transmit the synchronization signal on a time axis repeatedly four times. Consequently, a resource necessary to service the sector 2 is identical for both a beamforming scheme and a repetitive transmission scheme.

Yet, since a beam width is narrow in case of to beamforming scheme, a UE moving fast or a UE located on a sector boundary has difficulty in receiving a synchronization signal stably. Instead, if an ID of a UE located beam is identifiable, a UE can advantageously grasp its location through a synchronization signal. On the contrary, since a beam width is wide in case of a repetitive transmission scheme, it is less probable that a UE misses a synchronization signal. Instead, the UE is unable to grasp its location.

Figure 5:
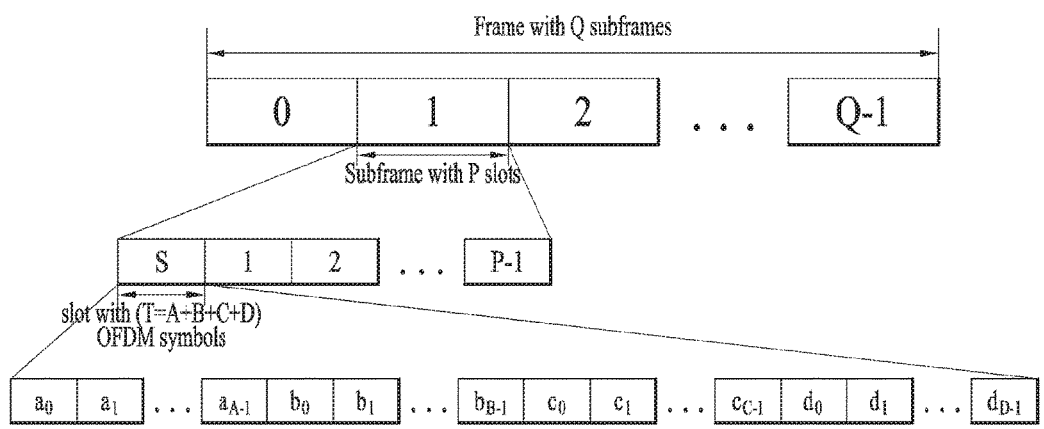
FIG. 5 shows an example of a frame structure proposed in a communication environment that uses mmWave.

FIG. 5 shows an example of a frame structure proposed in a communication environment that uses mmWave.

First of all, a single frame is configured with Q subframes, and a single subframe is configured with P slots. And, one slot is configured with T OFDM symbols. Here, unlike other subframes, a first subframe in a frame uses $0^{th}$ slot (slot denoted by 'S') for the usage of synchronization. And, the $0^{th}$ slot is configured with A OFDM symbols for timing and frequency synchronization, B OFDM symbols for beam scanning, and C OFDM symbols for informing a UE of system information. And, the remaining D OFDM symbols are used for data transmission to each UE.

Meanwhile, such a frame structure is a simple example only. Q, P, T, S, A, B, C and D are random values, and may include values set by a user or values set automatically on a system.

In the following, algorithm of timing synchronization between a base station and a UE is described. Let's consider a case that the base station transmits the same synchronization signal A times in FIG. 5. Based on the synchronization signal transmitted by the base station, the UE performs timing synchronization using the algorithm of Equation 3.

$$\hat{n} = \underset{\hat{n}}{\mathrm{argmax}} \frac{\left|\sum_{i=0}^{A-2} y_{\hat{n},i}^H y_{\hat{n},i+1}\right|}{\sum_{i=0}^{A-2} y_{\hat{n},i}^H y_{\hat{n},i+1}} \quad [\text{Equation 3}]$$

where $y_{\hat{n},i} \triangleq r[\hat{n}+i(N+N_g):\hat{n}+i(N+N_g)+N-1]$

In Equation 3, N, $N_g$ and i indicate a length of OFDM symbol, a length of CP (Cyclic Prefix) and an index of OFDM symbol, respectively. r means a vector of a received signal in a receiver. Here, the equation $y_{\tilde{n},i} \triangleq r[\tilde{n}+i(N+N_g): \tilde{n}+i(N+N_g)+N-1]$ is a vector defined with elements ranging)) from $(\tilde{n}+i(N+N_g))_{th}$ element to $(\tilde{n}+i(N+N_g)+N-1)_{th}$ element of the received signal vector r.

The algorithm of Equation 3 operates on the condition that 2 OFDM received signals adjacent to each other temporally are equal to each other. Since such an algorithm can use a sliding window scheme, it can be implemented with low complexity and has a property robust to a frequency offset.

Meanwhile, Equation 4 represents an algorithm of performing timing synchronization using correlation between a received signal and a signal transmitted by a base station.

$$\hat{n} = \underset{\hat{n}}{\mathrm{argmax}} \frac{\left|\sum_{i=0}^{A-1} y_{\hat{n},i}^H s\right|^2}{\sum_{i=0}^{A-1} |y_{\hat{n},i}|^2 \sum_{i=0}^{A-1} |s|^2} \quad [\text{Equation 4}]$$

In Equation 4, s means a signal transmitted by a base station and is a signal vector pre-agreed between a UE and a base station. Although the way of Equation 4 may have performance better than that of Equation 3, since Equation 4 cannot be implemented by a sliding window scheme, it requires high complexity. And, the way of Equation 4 has a property vulnerable to a frequency offset.

In continuation with the description of the timing synchronization scheme, a beam scanning process is described as follows. First of all, a beam scanning means an operation of a transmitter and/or a receiver that looks for a direction of a beam that maximizes a received SINR of the receiver. For example, a base station determines a direction of a beam through a beam scanning before transmitting data to a UE.

Further description is made by taking FIG. 4 as one example. FIG. 4 shows that a sector serviced by a single base station is divided into 8 areas. Here, the base station transmits a beam to each of (A1+B1), (A2+B2), (A3+B3) and (A4+B4) areas, and a UE can identify the beams transmitted by the base station. On this condition, a beam scanning process can be embodied into 4 kinds of processes. First of all, the base station transmits beams to 4 areas in sequence [i]. The UE determines a beam decided as a most appropriate beam among the beams in aspect of a received SINR [ii]. The UE feeds back information on the selected beam to the base station [iii]. The base station transmits data using a beam having the direction of the feedback [iv]. Through the above beam scanning process, the UE can receive DL data through a beam having an optimized received SINR.

Zadoff-Chu sequence is described in the following. Zadoff-Chu sequence is called Chu sequence or ZC sequence and defined as Equation 5.

$$x_r[n] = e^{\frac{j\pi r n(n+1)}{N}} \quad [\text{Equation 5}]$$

In Equation 5, N indicates a length of sequence, r indicates a root value, and $x_r[n]$ indicates an $n^{th}$ element of ZC sequence. The ZC sequence is characterized in that all elements are equal to each other in size [constant amplitude]. Moreover, a DFT result of ZC sequence is also identical for all elements.

In the following, ZC sequence and a cyclic shifted version of the ZC sequence have the following correlation such as Equation 6.

$$(x_r^{(i)})^H x_r^{(j)} = \begin{cases} N & \text{for } i = j \\ 0 & \text{elsewhere} \end{cases} \quad [\text{Equation 6}]$$

In Equation 6, $x_r^{(i)}$ is a sequence resulting from cyclic-shifting $x_r$ by i, and indicates 0 except a case that auto-correlation of ZC sequence is i=j. The ZC sequence also has zero auto-correlation property and may be expressed as having CAZAC (Constant Amplitude Zero Auto Correlation) property.

Regarding the final property of the ZC sequence ZC, the correlation shown in Equation 7 is established between ZC sequences having a root value that is a coprime of a sequence length N.

$$x_{r_1}^H x_{r_2} = \begin{cases} N & \text{for } r_1 = r_2 \\ \frac{1}{\sqrt{N}} & \text{elsewhere} \end{cases} \quad [\text{Equation 7}]$$

In equation 7, $r_1$ or $r_2$ is a coprime of N. For example, if N=111, $2 \leq r_1, r_2 \leq 110$ always meets Equation 7. Unlike auto-correlation of Equation 6, the mutual correlation of ZC sequence does not become 0 completely.

In continuation with ZC sequence, Hadamard matrix is described. The Hadamard matrix is defined as Equation 8.

$$H_{2^k} = \begin{bmatrix} H_{2^{k-1}} & H_{2^{k-1}} \\ H_{2^{k-1}} & -H_{2^{k-1}} \end{bmatrix} = H_2 \otimes H_{2^{k-1}} \quad [\text{Equation 8}]$$

where $H_1 = [1]$ $$H_2 = \begin{bmatrix} 1 & 1 \\ 1 & -1 \end{bmatrix}$$

In Equation 8, $2^k$ indicates a size of matrix. Hadamard matrix is a unitary matrix that always meets $H_n H_n^T = nI_n$ irrespective of a size n. Moreover, in Hadamard matrix, all columns and all rows are orthogonal to each other. For example, if n=4, Hadamard matrix is defined as Equation 9.

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{[Equation 9]}$$

From Equation 9, it can be observed that columns and rows are orthogonal to each other.

Figure 6:
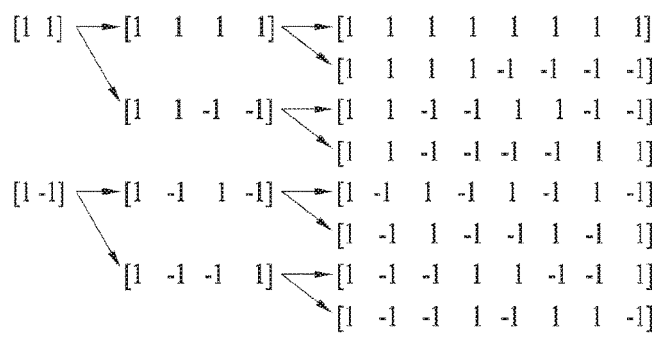
FIG. 6 shows a structure of OVSF (orthogonal variable spreading factor) code.

FIG. 6 shows a structure of OVSF (orthogonal variable spreading factor) code. The OVSF code is the code generated on the basis of Hadamard matrix and has specific rules.

First of all, in diverging to the right in the OVSF code [lower branch], a first code repeats a left mother code twice as it is and a second code is generated from repeating an upper code once, inverting it and then repeating the inverted code once. FIG. 6 shows a tree structure of OVSF code.

Such an OVSF code secures all orthogonality except the relation between adjacent mother and child codes on a code tree. For example, in FIG. 6, a code [1 −1 1 −1] is orthogonal to all of [1 1], [1 1 1 1], and [1 1 −1 −1]. Moreover, regarding the OVSF code, a length of code is equal to the number of available codes. Namely, it can be observed from FIG. 6 that a length of a specific ode is equal to the total number in a branch having the corresponding code belong thereto.

Figure 7:
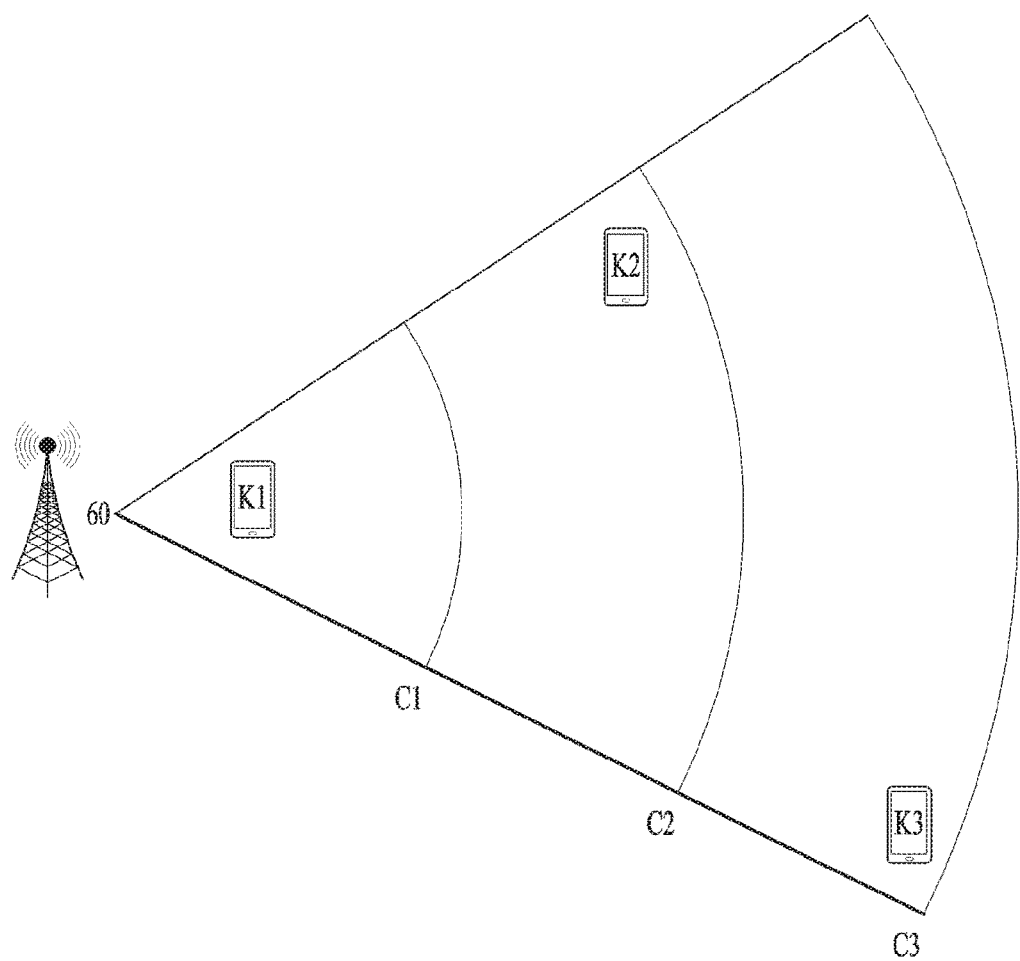
FIG. 7 is a diagram to describe a disposed situation of user equipments.

FIG. 7 is a diagram to describe a disposed situation of user equipments. RACH (Random Access CHannel) is described with reference to FIG. 7.

In case of LTE system, when RACH signals transmitted by UEs arrive at a base station, powers of the RACH signals of UEs received by the base station should be equal to each other. To this end, the base station defines a parameter 'preambleInitialReceivedTargetPower', thereby broadcasting the parameter to all UEs within a corresponding cell through SIB (System Information Block) 2. The UE calculates a pathloss using a reference signal, and then determines a transmit power of the RACH signal using the calculated pathloss and the parameter 'preambleInitialReceivedTargetPower' like Equation 10.

P_PRACH_Initial=min{P_C MAX,preambleInitial-ReceivedTargetPower+PL} [Equation 10]

In Equation 10, P_PRACH_Initial, P_CMAX, and PL indicate a transmit power of RACH signal, a maximum transmit power of UE, and a pathloss, respectively.

Equation 10 is taken as one example for the following description. A maximum transmittable power of UE is assumed as 23 dBm, and a RACH reception power of a base station is assumed as −104 dBm. And, a UE disposed situation is assumed as FIG. 7.

First of all, a UE calculates a pathloss using a received synchronization signal and a beam scanning signal and then determines a transmit power based on the calculation. Table 3 shows a pathloss of UE and a corresponding transmit power.

TABLE 3

| UE | preambleInitialReceivedTargetPower | Pathloss | Necessary transmit power | Transmit power | Additional necessary power |
|---|---|---|---|---|---|
| K1 | −104 dBm | 60 dB | −44 dBm | −44 dBm | 0 dBm |
| K2 | −104 dBm | 110 dB | 6 dBm | 6 dBm | 0 dBm |
| K3 | −104 dBm | 130 dB | 26 dBm | 23 dBm | 3 dBm |

In case of a UE K1 in table 3, a pathloss is very small. Yet, in order to match an RACH reception power, an RACH signal should be transmitted with very small power (−44 dBm). Meanwhile, in case of a UE K2, although a pathloss is big, a necessary transmit power is 6 dBm. Yet, in case of a UE K3, since a pathloss is very big, a necessary transmit power exceeds P_CMA=23 dBm. In this case, the UE should perform a transmission with 23 dBm that is a maximum transmit power and a rate of UE's RACH access success is degraded by 3 dB.

2. First Proposed Method for Transmitting and Receiving Synchronization Signal

Figure 8:
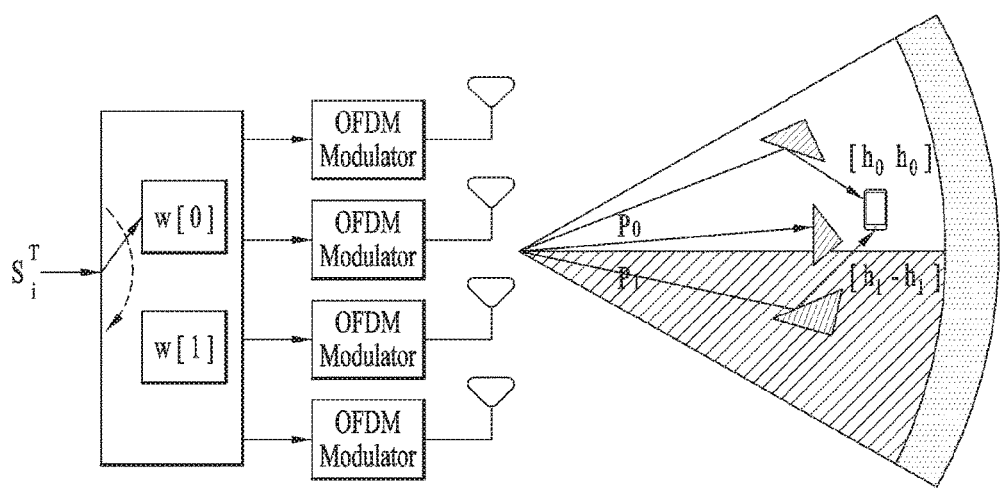
FIG. 8 is a diagram illustrating a synchronization signal transmission structure according to one embodiment.

FIG. 8 is a diagram illustrating a synchronization signal transmission structure according to a proposed embodiment. According to the proposed embodiment, a base station defines a new precoder consisting of weighted sums of two or more basic precoders applied to a repeatedly transmitted synchronization signal. And, the base station defines a plurality of new precoders, which are generated by changing the weighted sums, as a codebook.

FIG. 8 illustrates a case that the number of repeatedly transmitting a synchronization signal corresponds to 2. FIG. 8 illustrates a structure of repeatedly transmitting a synchronization signal for obtaining diversity.

First of all, the number of antennas of a base station transmitting a synchronization signal, a length of an OFDM symbol, and a length of a CP are defined as $N_T$, $N_S$, and $N_{CP}$, respectively. Basic precoders are defined as $p_0$, $p_1$, respectively. A new precoder configured by a weighted sum is defined as w[0], w[1]. In the basic precoder and the new precoder, '0' and '1' correspond to an order of transmitting a synchronization signal, i.e., an OFDM symbol. The basic precoder and the new precoder correspond to a vector matrix and a size of the vector matrix is identical to the number of antenna ports of the base station. In particular, in FIG. 8, a size of the $p_0$, $p_1$ and a size of the w[0], w[1] correspond to 4×1 vector.

Meanwhile, in the embodiment of FIG. 8, a codebook defined by the base station is represented by {w[0], w[1]} and the codebook can be comprehended as equation 11 described in the following.

$$w[0] = \frac{1}{\sqrt{2}}(p_0 + p_1), \quad w[1] = \frac{1}{\sqrt{2}}(p_0 - p_1) \quad \text{[Equation 11]}$$

where $p_j \in \mathbb{C}^{N_T \times 1}$, $\|p_j\|^2 = 1$, $\forall j$

In Equation 11, a precoder w[0] is configured by the sum of $p_0$, $p_1$ corresponding to basic precoders and a precoder w[1] is configured by a difference between the $p_0$, $p_1$. In particular, a new precoder w[0], w[1] is defined by a weighted sum of the two basic precoders and a weight of the weighted sum is different from each other. For example, in case of a cell structure shown in the right side of FIG. 8, a precoder corresponding to a subsector positioned at the top and a precoder corresponding to a subsector positioned at the bottom are defined as $p_0$ and $p_1$, respectively. In this case, a base station transmits a synchronization signal to a UE by applying a new precoder w[0] defined by a weighted sum [+1 −1] to the synchronization signal in a first OFDM symbol and transmits a synchronization signal to the UE by applying a new precoder w[1] defined by a different weighted sum [+1 −1] to the synchronization signal in a second OFDM symbol. In particular, although the UE is positioned at a subsector boundary, the UE is able to obtain diversity for the two precoders. Hence, the UE is able to precisely distinguish synchronization signals different from each other.

In the foregoing description, it is assumed that a repetition count corresponds to 2. Meanwhile, if the number of repeatedly transmitting a synchronization signal transmitted by the base station corresponds to $N_R$, a precoder codebook of the synchronization signal can be defined as equation 12 in the following in a manner of being generalized.

$$W_{N_R} = \frac{1}{\sqrt{N_R}} Q_{N_R} P_{N_R} \quad \text{[Equation 12]}$$

where $W_{N_R} = [w^T[0] w^T[1] \ldots w^T[N_R-1]]^T$ $P_{N_R}^T = [p_0^T p_1^T \ldots p_{N_R-1}^T]^T$, $Q_{N_R} \triangleq H_{N_R} \otimes I_{N_T}$ In equation 12, a vector w[t] corresponds to a precoder applied to a synchronization signal which is repeatedly transmitted at $t^{th}$ time. A synchronization codebook is defined by $\{w[0], w[1], \ldots, w[N_R-1]\}$ and a matrix $H_{N_R}$ indicating a channel corresponds to a random matrix of a size of $N_R$.

In particular, when a base station repeatedly transmits a synchronization signal, a codebook is configured by weighted sums of basic precoders. The base station selects a precoder from the codebook including a plurality of new precoders different from each other and applies the selected precoder to the synchronization signal whenever the synchronization is repeated. The number of new precoders included in the codebook may be identical to the number of repeatedly transmitting the synchronization signal.

Figure 9:
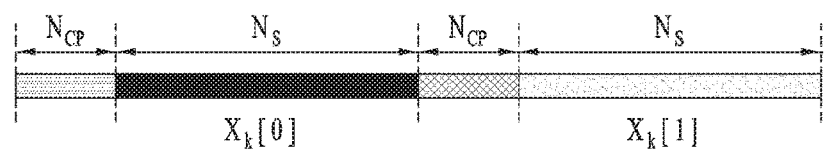
FIG. 9 illustrates a repeatedly transmitted synchronization signal according to one embodiment.

FIG. 9 illustrates a repeatedly transmitted synchronization signal according to a proposed embodiment.

Meanwhile, according to a different proposed embodiment, when a base station repeatedly transmits a synchronization signal, the base station may transmit the synchronization signal by selecting a precoder which is not selected from a codebook whenever the synchronization is repeatedly transmitted. In particular, in order to maximize transmission diversity of the synchronization signal, the base station selects a precoder which is not selected from among the $N_R$ number of precoders included in a codebook $\{w[0], w[1], \ldots, w[N_R-1])\}$ whenever the synchronization signal is repeated.

For example, in case of the equation 11 of which the repetition count corresponds to 2, when the base station transmits a synchronization signal in a first OFDM symbol, the base station selects a precoder w[0] from a codebook $\{w[0], w[1]\}$. When the transmits a synchronization signal in a second OFDM symbol, the base station selects a precoder w[1]. This procedure is shown in the left side of FIG. 8 as a structure of changing a switch of an RF module. In this case, as shown in equation 13 in the following, a synchronization signal, which is transmitted via a $k^{th}$ antenna among the $N_T$ number of transmission antennas, is generated using an $i^{th}$ sequence $s_i$ and precoders w[0], w[1].

$x_k[0] = F^H w_k[0] s_i$ $x_k[1] = F^H w_k[1] s_i$ [Equation 13]

where $x_k[t] \in C^{N_S \times 1}$, k=0, ..., $N_T-1$ $s_i \in C^{N_S \times 1}$ In equation 13, corresponds to an IDFT (Inverse Discrete Fourier Transform) matrix and $w_k[t]$ corresponds to a $k^{th}$ element of a precoder w[t]. FIG. 9 shows a procedure that a synchronization signal is repeatedly transmitted two times in the $k^{th}$ antenna mentioned earlier in the equation 13.

Figure 10:
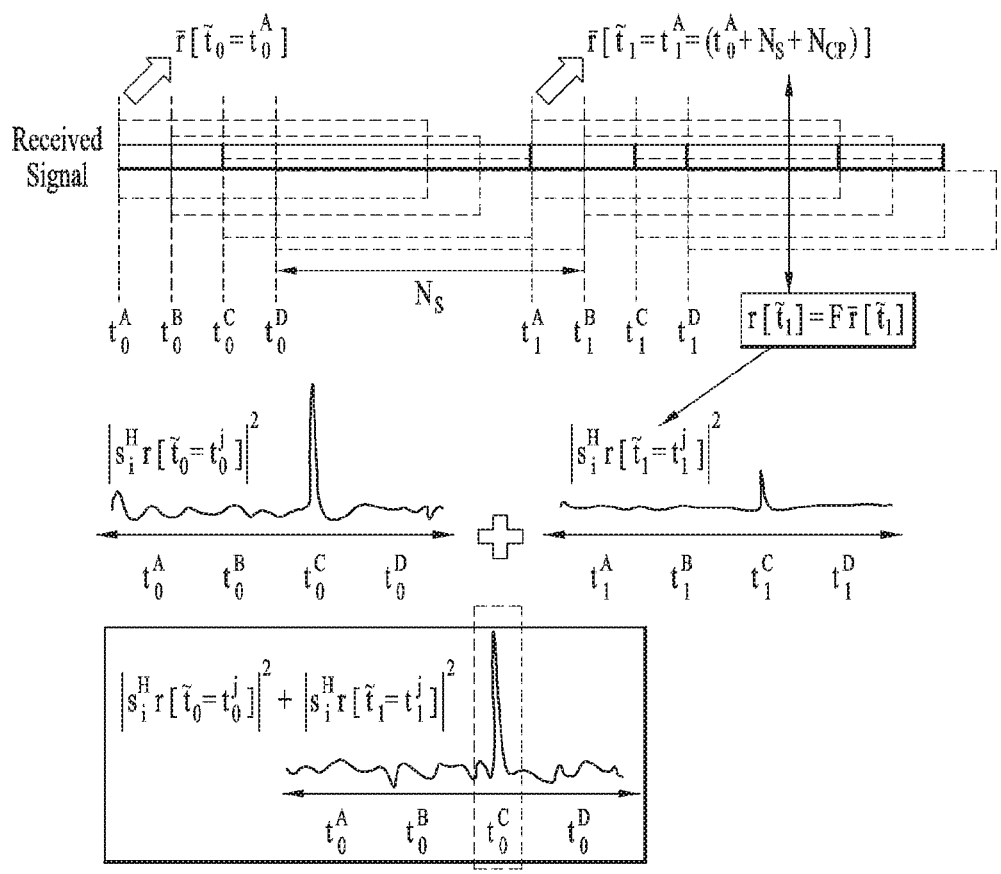
FIG. 10 illustrates a process for a UE, which has received a synchronization signal, to estimate a sequence and timing.

FIG. 10 illustrates a process for a UE, which has received a synchronization signal, to estimate a sequence and timing.

In FIG. 10, an operation of a UE is explained when a base station repeatedly transmits a synchronization signal according to the aforementioned embodiments.

First of all, an algorithm for a UE to synchronize timing from a synchronization signal received from a base station and estimate a sequence can be represented as equation 14 described in the following.

$$\{\tilde{t}_0, \hat{i}\} = \underset{\tilde{t}_0, i}{\operatorname{argmax}} [|s_i^H r[\tilde{t}_0]|^2 + |s_i^H r[\tilde{t}_1]|^2] \quad \text{[Equation 14]}$$

In equation 14, $\{\tilde{t}_0, \hat{i}\}$ corresponds to trial numbers for estimating timing and a sequence, respectively. $\{\tilde{t}_0, \hat{i}\}$ corresponds to a trial number when a result value of the equation 14 becomes a maximum value. In particular, the $\{\tilde{t}_0, \hat{i}\}$ corresponds to an index of the timing and the sequence estimated from a synchronization signal received by a UE.

Meanwhile, the equation 14 can be schematically represented as FIG. 10. In FIG. 10, 4 timings different $\{t_0^A, t_0^B, t_0^C, t_0^D\}$ from each other are depicted. A correlation size between a reception signal and a sequence at each timing is shown in FIG. 10. In FIG. 10, $\bar{r}[\tilde{t}_o = t_0^A]$ corresponds to a reception signal vector received at the timing $t_0^A$ and a length of the reception signal vector corresponds to $N_S$. $r[\tilde{t}_o = t_0^A]$ corresponds to a signal after DFT processing is performed on $\bar{r}[\tilde{t}_o = t_0^A]$.

Referring to FIG. 10, the UE calculates the equation 14 by applying timing $\tilde{t}_0$ and a sequence index $\tilde{i}$ as trial numbers. In the example of FIG. 10, when the UE calculates the equation 14, since a correlation value calculated at the timing $t_0^C$ is the biggest, the UE determines the $t_0^C$ as timing of a synchronization signal and determines that an $i^{th}$ sequence has been transmitted.

Meanwhile, if a channel is not changed and noise does not occur while a synchronization signal is repeatedly received two times, a size of a peak value calculated via the equation 14 can be represented as equation 15 described in the following.

$|s_{\tilde{i}=i}^H r[\tilde{t}_0 = t_0^C]|^2 + |s_{\tilde{i}=i}^H r[\tilde{t}_1 = t_1^C]|^2 = P(|h_0|^2 + |h_1|^2)$ [Equation 15]

In equation 15, $h_i = p_i^T g$ is satisfied and g corresponds to a channel between a transmitter and a receiver. Reception SNR of a UE can be calculated as equation 16 described in the following based on the equation 15.

$$SNR_{Repetition} = \frac{2P|h_0|^2}{\sigma_w^2} \rightarrow SNR_{Proposed} = \frac{P(|h_0|^2 + |h_1|^2)}{\sigma_w^2} \quad \text{[Equation 16]}$$

In equation 16, $SNR_{Repetition}$ indicates reception SNR when a synchronization signal is transmitted by simply repeating the synchronization signal and $SNR_{proposed}$ indicates reception SNR when a synchronization signal is transmitted by configuring a precoder for obtaining diversity according to a proposed embodiment. In the former case, reception power of the synchronization signal is doubled. On the contrary, in the latter case, reception power is represented by two channels including $|h_0|^2$ and $|h_1|^2$. If the $|h_0|^2$ and $|h_1|^2$ are independent from each other, a diversity gain of the $SNR_{proposed}$ is doubled. In the meantime, since the reception power of the $SNR_{Repetition}$ is represented by a single channel only, a diversity gain of the $SNR_{Repetition}$ becomes 1.

Meanwhile, since it is necessary for all UEs belonging to a cell to detect a synchronization signal, the most important element of the synchronization signal is stability of a communication link. As a diversity gain has a higher value, the stability of the communication link can be increased. Hence, if it follows the proposed embodiment, it may be able to obtain an enhanced effect compared to a legacy synchronization signal transmission method.

Figure 11:
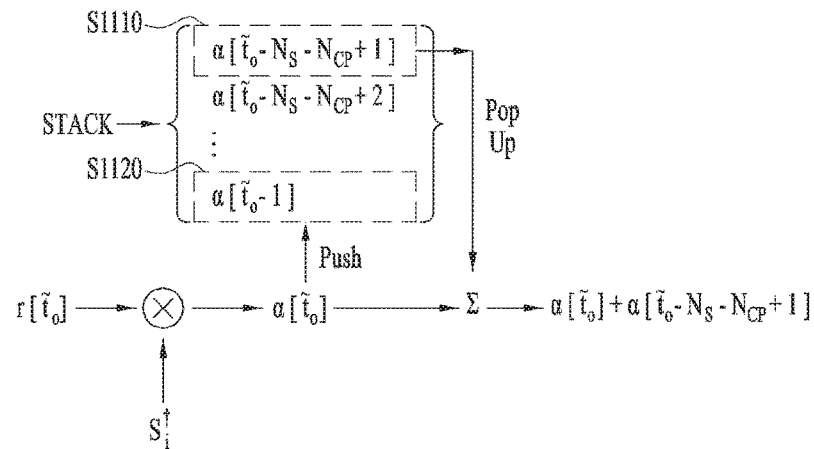
FIG. 11 illustrates a different embodiment of a process for a UE to synchronize timing using a synchronization signal.

FIG. 11 illustrates a different embodiment of a process for a UE to synchronize timing using a synchronization signal.

According to what is mentioned earlier in FIG. 10 and equation 15, a peak value at the timing of $t_0=t_0^A$ is calculated as $|s_i^\dagger r[\tilde{t}_o=t_0^A]|^2+|s_i^\dagger r[\tilde{t}_1=t_1^A]|^2$. Meanwhile, a peak value at the timing of $t_0=t_1^A=(t_0^A+N_S+N_{CP})$ is calculated as $|s_i^\dagger r[\tilde{t}_o=t_1^A]|^2+|s_i^\dagger r[\tilde{t}_1=t_1^A+N_S+N_{CP}]|^2$. In this case, it is able to see that a term $|s_i^\dagger r[\tilde{t}_1=t_1^A]|^2$ is common to the two peak values.

In particular, according to the proposed embodiment, while a value $|s_i^\dagger r[\tilde{t}_1=t_1^A]|^2$, which is obtained by a UE in the course of calculating the peak value at the timing of $t_0^A$, is stored in a stack, the UE may utilize a value stored in the course of calculating the peak value at the timing of $t_0=t_1^A=(t_0^A+N_S+N_{CP})$. Consequently, the UE can reduce calculation complexity by avoiding overlapped calculation by utilizing a memory.

The abovementioned content is shown in FIG. 11. In FIG. 11, $\alpha[\tilde{t}_0]$ is defined as $\alpha[\tilde{t}_0] \triangleq |s_i^\dagger r[\tilde{t}_0]|^2$. A step [S1120] of storing a value currently obtained in the course of calculating a peak value is defined as a 'push' operation and a step [S1110] of retrieving a value stored in a stack in advance and using the value is defined as a 'pop up' operation. In FIG. 11, since the 'push' operation and the 'pop up' operation make a pair, the total size of the stack is always maintained by $(N_S+N_{CP})$.

Meanwhile, as mentioned in the foregoing description, an embodiment of using a stack can be extended to a random repetition count $N_R$. In this case, the stack is defined as equation 17 described in the following and a size of the stack becomes $(N_R-1)(N_S+N_{CP})$. In particular, a UE stores values calculated during a time period as much as the sum of a length of an OFDM symbol and a CP length in the stack. If the time period as much as the sum of the length of the OFDM symbol and the CP length elapses, the UE retrieves the values stored in the stack and utilizes the values for new calculation.

$$\begin{cases} \alpha[\tilde{t}_0 - (N_R - 1)(N_S + N_{CP}) + 1] \\ \alpha[\tilde{t}_0 - (N_R - 1)(N_S + N_{CP}) + 2] \\ \vdots \\ \alpha[\tilde{t}_0 - 1] \end{cases}$$  [Equation 17]

Figure 12:
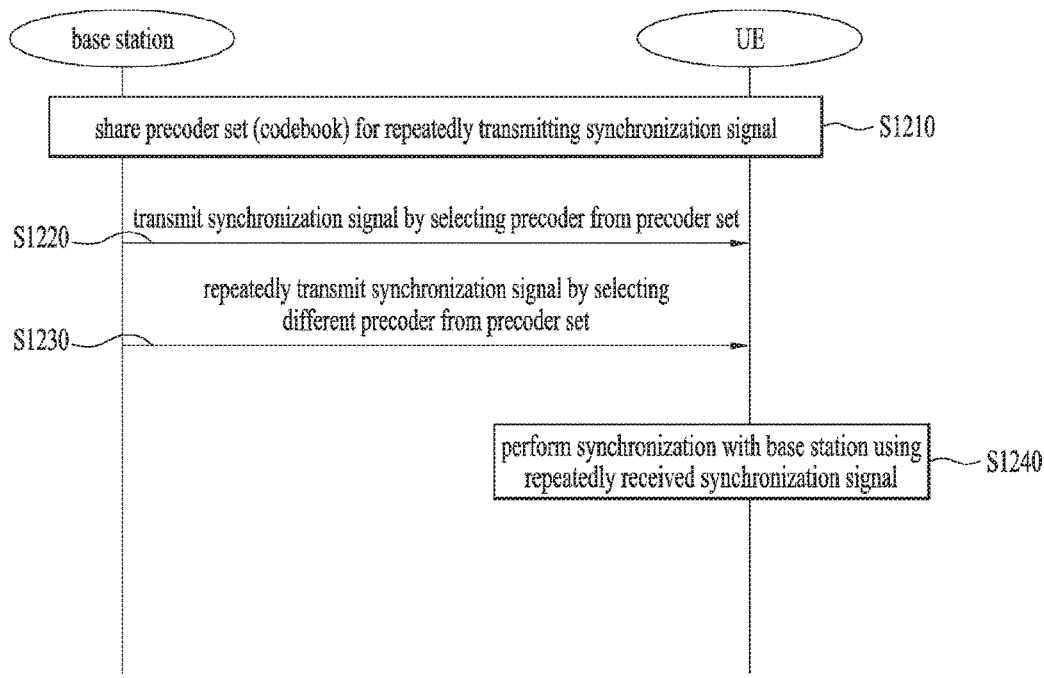
FIG. 12 is a flowchart for a method of transmitting and receiving a synchronization signal according to one embodiment.

FIG. 12 is a flowchart for a method of transmitting and receiving a synchronization signal according to one embodiment. In FIG. 12, the aforementioned embodiments are depicted and explained according to a flow of time. In particular, although it is not explicitly described in FIG. 12, the aforementioned contents can be identically or similarly applied.

First of all, a base station and a UE share a precoder set (i.e., a codebook) for repeatedly transmitting a synchronization signal [S1210]. The codebook includes a plurality of new precoders configured by weighted sums of basic precoders. A weighted sum is differently applied to each of a plurality of the new precoders. Meanwhile, the codebook generated by the base station can be transmitted to the UE. Or, the UE may directly generate the codebook.

Subsequently, the base station transmits a synchronization signal by selecting one from among the precoders constructing the precoder set (codebook) [S1220]. A precoder can be randomly selected from among the precoders included in the precoder set as a precoder applied to the synchronization signal. Subsequently, the base station selects a different precoder from the precoder set (codebook) in a next OFDM symbol and repeatedly transmits the synchronization signal [S1230]. In the step S1230, a precoder rather than the precoder selected in the step S1220 is selected from the precoder set. In FIG. 12, it is assumed a case that the number of repeatedly transmitting the synchronization signal corresponds to 2. If the repetition count is higher, the step S1230 can be repeatedly performed.

The UE performs synchronization with the base station using the repeatedly received synchronization signal [S1240]. This step can be comprehended as a step of estimating a best value by calculating a correlation between timing of the received synchronization signal and a sequence. When the UE calculates the correlation, it may apply an embodiment of storing median values in a stack and retrieving the values.

According to the aforementioned embodiments, since it is able to obtain transmission diversity in the course of repeatedly transmitting a synchronization signal, it is able to secure stability of a communication link. As a result, it is able to stably forward the synchronization signal to a UE in communication environment where a pathloss considerably occurs such as mmWave communication system.

3. Second Proposed Method for Transmitting and Receiving Synchronization Signal

Figure 13:
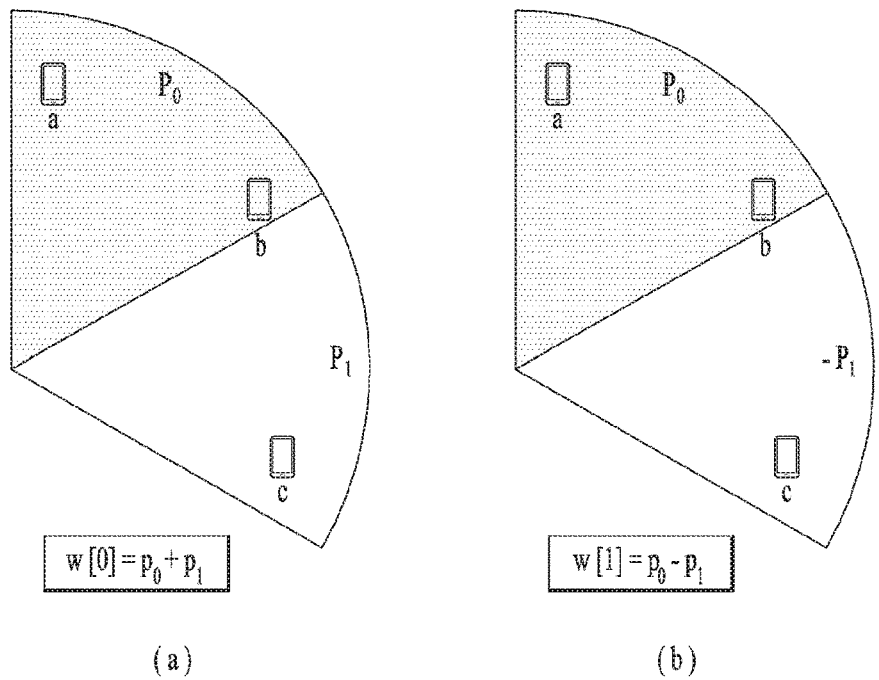
FIG. 13 is a diagram for proposing a further different embodiment related to a method of transmitting and receiving a synchronization signal.

FIG. 13 shows a synchronization signal transmission structure according to FIGS. 8 to 12. The reception SNR mentioned earlier in the equation 16 can be represented as equation 18 described in the following in consideration of a pathloss.

$$SNR_{Proposed} = \frac{P(\beta_0|h_0|^2 + \beta_1|h_1|^2)}{\sigma_w^2}$$  [Equation 18]

In equation 18, $\beta_0$ and $\beta_1$ correspond to a pathloss when beams transmitted by precoders $p_0$, $p_1$ arrive at a UE.

Meanwhile, in FIG. 13, since a UE b is located at a boundary of two subsectors, the UE b receives both of the beams transmitted by the $p_0$, $p_1$. Hence, $\beta_0 \approx \beta_1$ is satisfied. In this environment, reception SNR for the UE b can be approximated as shown in equation 19 described in the following.

$$SNR_{Proposed} \approx \frac{P\beta_0(|h_0|^2 + |h_1|^2)}{\sigma_w^2}$$  [Equation 19]

The equation 19 means that a diversity gain for the UE b can be obtained by 2.

Meanwhile, since a UE a is located at a position far from $p_1$, $\beta_0 \gg \beta_1$ is satisfied. In this environment, reception SNR of the UE a can be approximated as shown in equation 20 described in the following.

$$SNR_{Proposed} \approx \frac{P\beta_0|h_0|^2}{\sigma_w^2}$$  [Equation 20]

The equation 20 means that a diversity gain obtained by the UE a corresponds to 1 rather than 2. On the contrary, a UE c is located at a position far from $p_0$. Similar to the UE a, the UE c can only obtain a diversity gain as much as 1. In other word, according to the aforementioned embodiments mentioned earlier in FIGS. 8 to 12, although the UE b is able to obtain sufficient diversity gains, the UEs a and c are unable to obtain sufficient diversity gains.

A UE should receive a synchronization signal with quality equal to or greater than a certain level irrespective of a position of the UE in a cell. Hence, in the following, an embodiment for enhancing a point that UEs obtain a different diversity gain according to a position in a cell is proposed.

In the contents mentioned earlier in FIGS. 8 to 12, a scheme of designing a 'basic precoder $p_i$' is proposed. In the following description, a 'second precoder' corresponds to the aforementioned basic precoder $p_i$. According to the proposed embodiment, the second precoder is configured by a weighted sum of two or more 'first precoders ($q_j$). In relation to the contents mentioned earlier in FIGS. 8 to 12, the second precoder ($p_i$) is defined by weighted sums of a plurality of first precoders ($q_j$) and a new precoder w[t] (hereinafter, third precoder) is defined by weighted sums of a plurality of second precoders.

When a $j^{th}$ first precoder and an $i^{th}$ second precoder are represented as $q_j$ and $p_i$, respectively, a relation between the two precoders is represented according to equation 21 described in the following.

$$P_i = \sum_{n=0}^{Q_i-1} w_{in} q_{f_i(n)}, \ w_{in} \in C \quad \text{[Equation 21]}$$

In equation 21, $w_{in}$ corresponds to a complex number and indicates a weight for first precoders that construct an $i^{th}$ second precoder. In particular, the $w_{in}$ indicates a form of weighted sums of the first precoders. $Q_i$ corresponds to the number of first precoders constructing an $i^{th}$ second precoder. $f_i(n)$ corresponds to indexes of the first precoders that construct the $i^{th}$ second precoder.

An equation 22 described in the following shows an example that second precoders are configured by a weighted sum of two first precoders.

$$p_0 = q_0 + q_2$$

$$p_1 = q_1 + q_3 \quad \text{[Equation 22]}$$

In equation 22, $Q_0 = Q_1 = 2$, $\{f_0(0)=0, f_0(1)=2, f_1(0)=1, f_1(1)=3\}$, and $w_{00}=w_{01}=w_{10}=w_{11}=1$ are satisfied. Since $w_{in}$ corresponds to a complex number, a second precoder can be implemented in a form that a specific first precoder is multiplied by j or −j that changes a phase.

Figure 14:
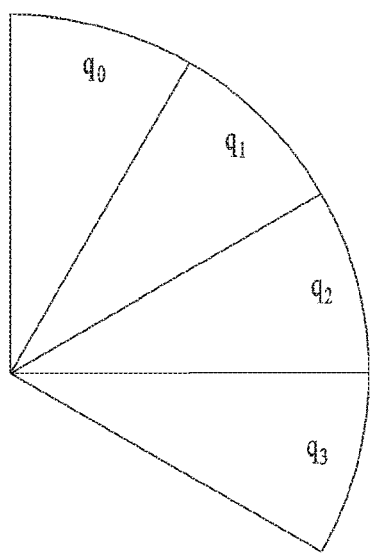
FIGS. 14 to 17 are diagrams illustrating a synchronization signal transmission structure according to a further different embodiment.

FIG. 14 illustrates an example of designing first precoders that configure a second precoder.

According to one embodiment, it may be able to design first precoders to divide a region to which a synchronization signal is transmitted with a size as equal as possible. In an embodiment shown in FIG. 14, the first precoders are designed to divide a region 120' to which a synchronization signal is transmitted with the same size in a manner that each beam is formed by 30'.

In this case, the first precoders can be designed to make a minimum Chordal distance between the first precoders to be the maximum. The minimum Chordal distance corresponds to an interval between beams formed by a precoder.

If the minimum Chordal distance becomes the maximum, it means that the interval between beams formed by precoders becomes the maximum, i.e., a correlation between beams becomes the minimum. For example, it may be able to design a first precoder to make the minimum Chordal distance to be the maximum using a DFT codebook.

Figure 15:
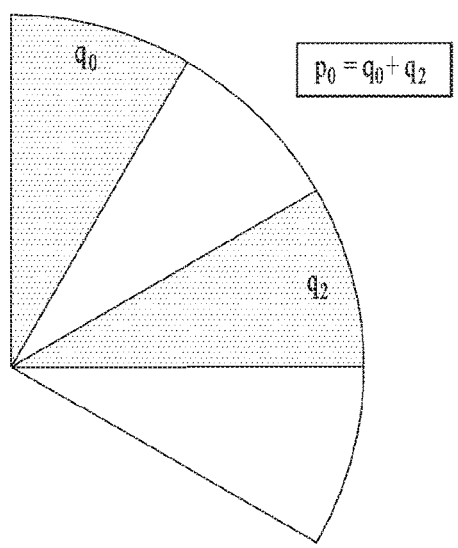
Figure 15:
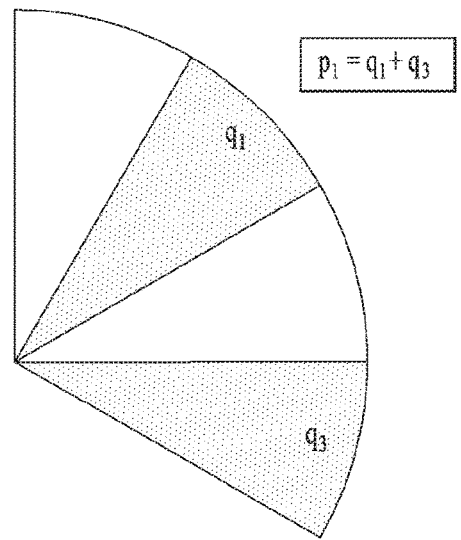
Figure 16:
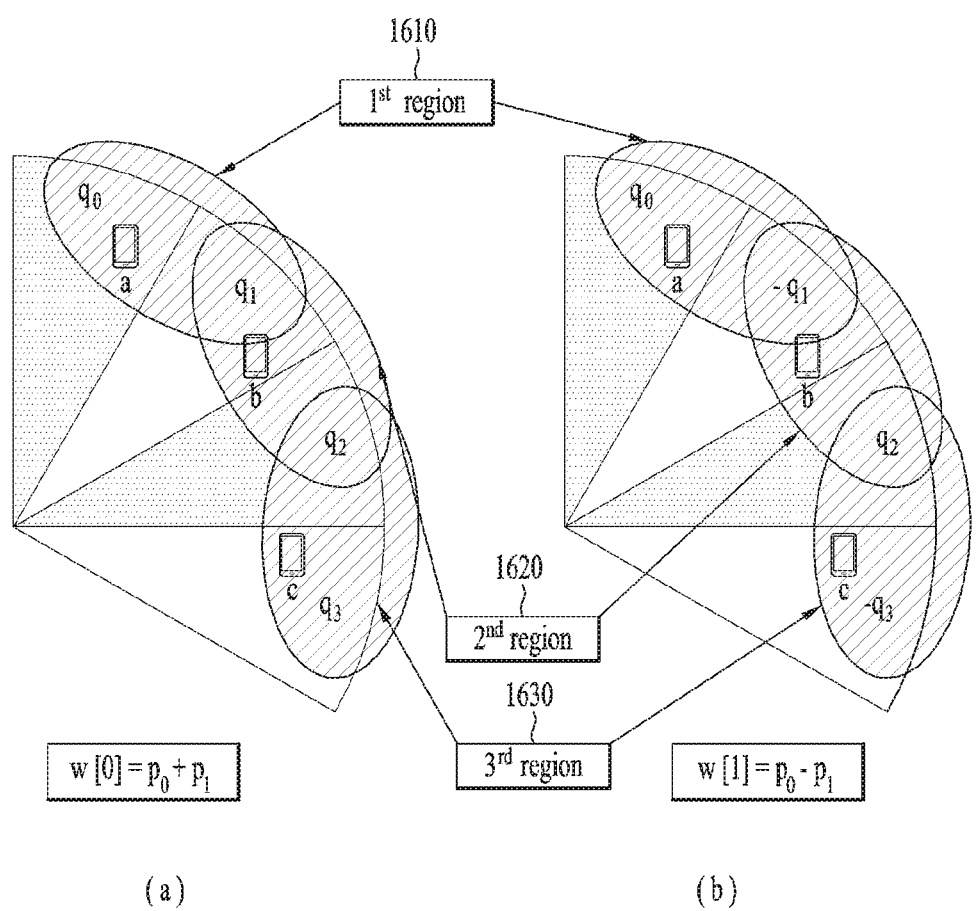
Figure 17:
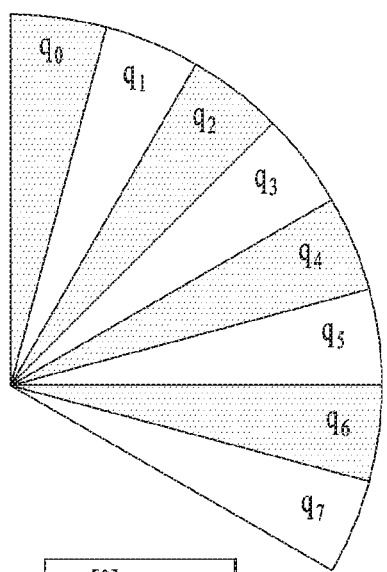
Figure 17:
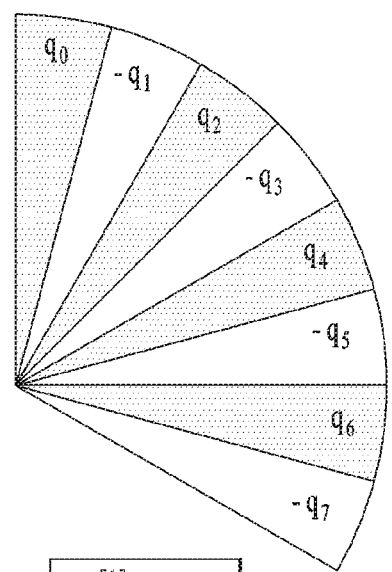

FIGS. 15 to 17 are diagrams illustrating a synchronization signal transmission structure according to a further different embodiment. In the following, in addition to the aforementioned contents, embodiments of designing a second precoder using a first precoder are explained.

According to one embodiment, a second precoder is configured by weighted sums of first precoders and can be designed with a comb structure. As shown in FIG. 14, the comb structure means that regions are not adjacent to each other within a subsector of first precoders that construct a second precoder and a minimum distance between the regions is the same within the subsector of the first precoders.

For example, referring to FIG. 15(a), regions of first precoders $q_0$ and $q_2$ constructing a second precoder $p_0$ are not adjacent to each other. And, referring to FIG. 15(b), regions of first precoders $q_1$ and $q_3$ constructing a second precoder $p_1$ are not adjacent to each other. Moreover, a minimum distance between regions within a subsector of the first precoders $q_0$ and $q_2$ constructing the second precoder corresponds to 30' and a minimum distance between regions within a subsector of the first precoders $q_1$ and $q_3$ constructing the second precoder $p_1$ corresponds to 30' as well. A beam region of the second precoder $p_1$ can be comprehended as a form that a beam region of the second precoder $p_0$ is shifted as much as 30'.

Meanwhile, when a second precoder is configured using a first precoder according to the aforementioned embodiments, third precoders shown in the equation 11 can be represented as equation 23 described in the following.

$$w[0] = \frac{1}{\sqrt{2}}(p_0 + p_1) = \frac{1}{\sqrt{2}}(q_0 + q_1 + q_2 + q_3) \quad \text{[Equation 23]}$$

$$w[1] = \frac{1}{\sqrt{2}}(p_0 - p_1) = \frac{1}{\sqrt{2}}(q_0 - q_1 + q_2 - q_3)$$

In equation 23, in case of signs of $q_1$, $q_3$, it is able to see that a phase of a synchronization signal has reversed for a partial region within a subsector in a second time period.

FIG. 16 illustrates a case of designing a second precoder according to a proposed embodiment. As mentioned earlier in the equation 23, a phase of $q_1$, $q_3$ reverses for a time period of two times. Meanwhile, a phase change of a beam is explained according to a time period for each of regions 1610, 1620, and 1630. A phase of a beam is changed to $\{q_0,q_1\} \rightarrow \{q_0,-q_1\}$ over a first time period and a second time period for the region 1610. A phase of a beam is changed to $\{q_1,q_2\} \rightarrow \{-q_1,q_2\}$ over a time period of total two times for the region 1620 and a phase of a beam is changed to $\{q_2,q_3\} \rightarrow \{q_2,-q_3\}$ for the region 1630.

Unlike the case mentioned earlier in FIG. 13, a UE a experiences a phase change of an adjacent beam $q_1$ over a time period of two times. Hence, the UE a can obtain a diversity gain as much as 2 for a synchronization signal. Similarly, a UE b experiences a phase change of a beam $q_1$ and a UE c experiences a phase change of a beam $q_3$. As a result, all UEs belonging to a subsector can obtain the same diversity gain.

FIG. 17 illustrates an embodiment that a region in a subsector corresponding to first precoders is designed to be more narrower. In FIGS. 14 to 16, 4 first precoders are assumed. On the contrary, in FIG. 17, a second precoder is designed through 8 first precoders. According to the embodiment proposed in FIG. 17, UEs receiving a synchronization signal can receive a more uniform diversity gain compared to the embodiments proposed in FIGS. 14 to 16.

Figure 18:
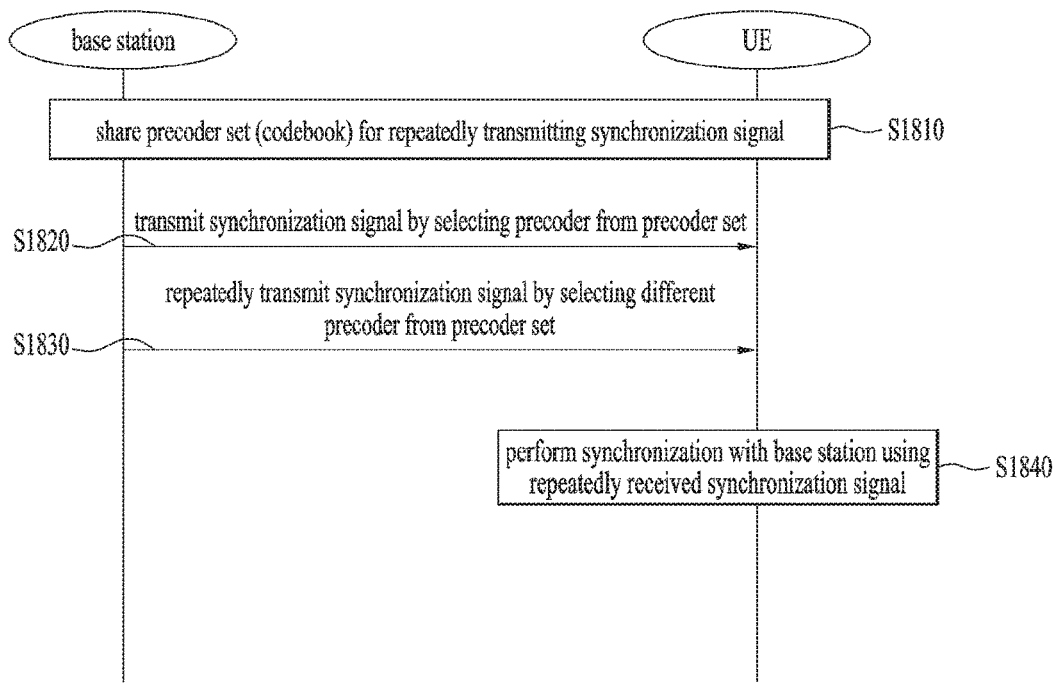
FIG. 18 is a flowchart for a method of transmitting and receiving a synchronization signal according to FIGS. 14 to 17.

FIG. 18 is a flowchart for a method of transmitting and receiving a synchronization signal according to a further different embodiment. In FIG. 18, the aforementioned embodiments are depicted and explained according to a time flow. In particular, although it is not explicitly described in FIG. 18, the aforementioned contents can be identically or similarly applied.

First of all, a base station and a UE share a precoder set (i.e., a codebook) for repeatedly transmitting a synchronization signal [S1810]. The codebook can include third precoders configured by weighted sums of second precoders. A weighted sum is differently applied to each of the second precoders. Meanwhile, the second precoders can also be configured by weighted sums of first precoders. Regions are not adjacent to each other within a subsector of the first precoders that construct each of the second precoders. A minimum distance between the regions within the subsector of the first precoders can be designed using the same comb structure. Meanwhile, as mentioned earlier in FIG. 12, the codebook can be transmitted to the UE in a manner of being generated by the base station. Or, the UE may directly generate the codebook.

Subsequently, the base station transmits a synchronization signal by selecting one from among third precoders constructing the precoder set (codebook) [S1820]. A precoder can be randomly selected from among the third precoders included in the precoder set as a third precoder applied to the synchronization signal. Subsequently, the base station selects a different third precoder from the precoder set (codebook) in a next OFDM symbol and repeatedly transmits the synchronization signal [S1830]. In the step S1830, a third precoder rather than the precoder selected in the step S1820 is selected from the precoder set. In FIG. 18, it is assumed a case that the number of repeatedly transmitting the synchronization signal corresponds to 2. If the repetition count is higher, the step S1830 can be repeatedly performed.

The UE performs synchronization with the base station using the repeatedly received synchronization signal [S1840]. This step can be comprehended as a step of estimating a best value by calculating a correlation between timing of the synchronization signal received by the UE and a sequence. When the UE calculates the correlation, the step S1840 may apply an embodiment of storing median values in a stack and retrieving the values according to the embodiments mentioned earlier in FIGS. 10 and 11.

According to the aforementioned embodiments, since it is able to obtain transmission diversity in the course of repeatedly transmitting a synchronization signal, it is able to secure stability of a communication link. And, it is able to transmit the synchronization signal to UEs belonging to a cell using a constant diversity gain without additional signaling overhead.

Figure 19:
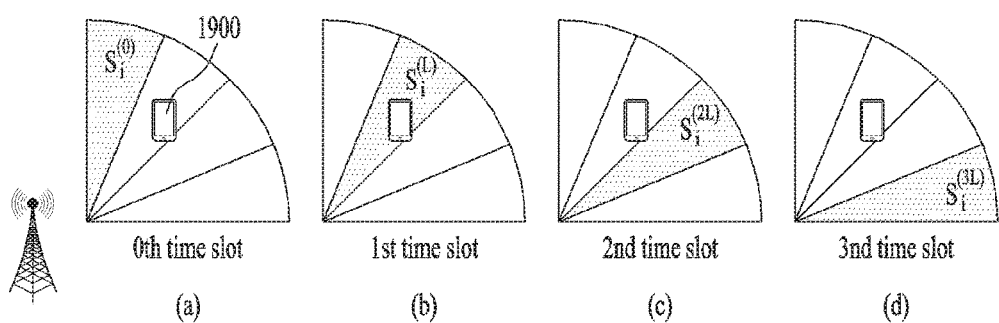
FIGS. 19 and 20 illustrate a synchronization signal and a beam scanning signal transmission structure for explaining a further different embodiment.
Figure 20:
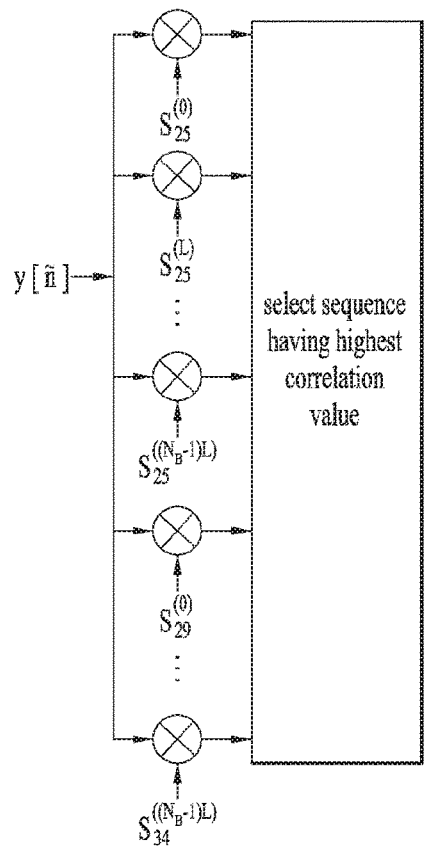

4. Synchronization Procedure and Beam Scanning Procedure Proposed in the Present Invention FIGS. 19 and 20 illustrate a synchronization signal and a beam scanning signal transmission structure for explaining a further different embodiment. In FIGS. 19 and 20, a synchronization procedure and a beam scanning procedure are explained according to the aforementioned synchronization signal transmission/reception scheme.

FIG. 19 illustrates a procedure for a base station to transmit a synchronization signal by switching 4 beams during 4 time slots. A UE performs a synchronization procedure using received synchronization signals and performs a beam scanning procedure at the same time. For example, a UE 1900 performs synchronization via a second beam (FIG. 19(b)) of which strongest reception power is detected. In order to distinguish a beam selected by the UE from other beams, the base station maps each of the beams using a different sequence. Consequently, the UE 1900 is able to know that a sequence of the beam selected by the UE corresponds to $s_i^{(L)}$. The UE feedbacks the selected beam to the base station to perform the beam scanning procedure.

In the aforementioned procedure, a signal transmitted by the base station is designed based on a ZC (Zadoff-Chu) sequence. A cell ID of the base station is used as a root value of the ZC sequence and a beam ID can be used as a cyclic shift value of the ZC sequence. For example, in a sequence $s_i^{(jL)}$, a root value is defined by $i \in \{25,29,34\}$ and a cyclic shift value is defined by $jL \in \{0,L,2L,3L\}$. In this case, L corresponds to a system parameter value and is configured to be larger than a delay spread maximum value of a channel in general. The UE can identify 3 cells and 4 beams of each cell using the sequence $s_i^{(jL)}$. This procedure can be represented as equation 24 described in the following.

$$\{\hat{i}_0, \hat{i}, \hat{j}\} = \arg\max_{\hat{i}_0, \hat{i}, \hat{j}} \left[ \left| \left(s_i^{\hat{j}}\right)^H r[\hat{i}_0] \right|^2 \right] \quad \text{[Equation 24]}$$

The UE performs timing synchronization, cell ID estimation, and beam ID estimation at the same time through the equation 24. FIG. 20 shows the procedure.

Referring to FIG. 20, a UE is configured to include 12 correlators in total to identify 3 cells and 4 beams at the same time and the 12 correlators operate together in every time slot. In case of legacy LTE, since it is necessary to identify a cell only, the UE is configured to include 3 correlators in total. On the contrary, in case of mmWave communication system, since a beam scanning procedure is included in the system, it is required to have processing power greater than LTE as much as 4 times. Consequently, according to the aforementioned scheme, calculation complexity required for the UE to perform a synchronization procedure increases as much as 4 times.

Figure 21:
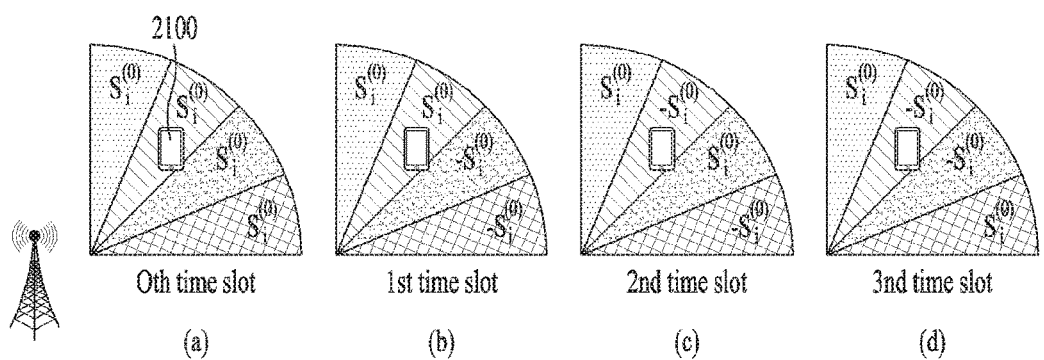
FIGS. 21 to 23 illustrate a synchronization signal and a beam scanning signal transmission structure according to a proposed embodiment.
Figure 22:
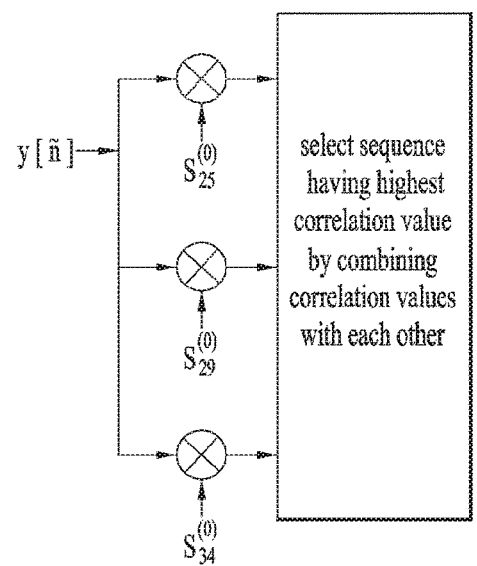
Figure 23:
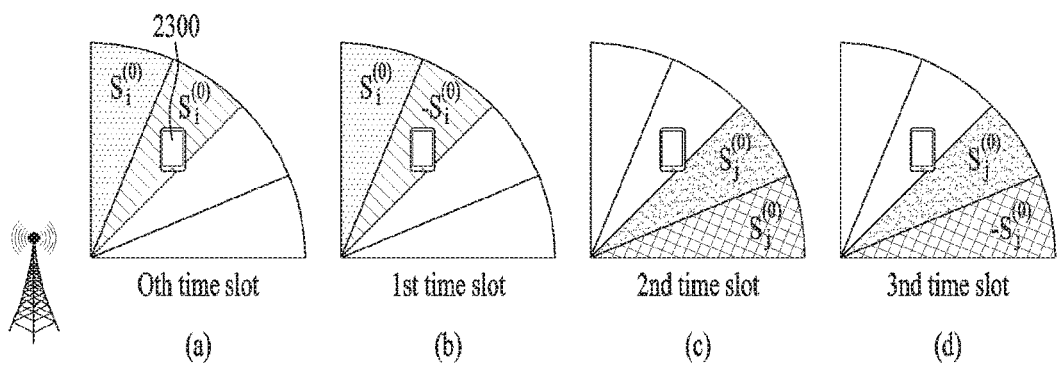

Hence, in the following, an embodiment for enhancing complexity of a UE in a synchronization procedure and a beam scanning procedure is proposed. FIGS. 21 to 23 illustrate a transmission structure of a synchronization signal and a beam scanning signal according to a proposed embodiment. According to the proposed embodiment, a beam ID is defined as weights applied to a weighted sum for the aforementioned basic precoder (or, a second precoder).

For example, assume a case that the number of repeatedly transmitting a synchronization signal corresponds to 2. Equation 25 described in the following illustrates a synchronization signal codebook when a repetition count corresponds to 2.

$$\begin{bmatrix} w[0] \\ w[1] \end{bmatrix} = \sqrt{\frac{P}{2}} \left( \begin{bmatrix} 1 & 1 \\ 1 & -1 \end{bmatrix} \otimes I_{N_T} \right) \begin{bmatrix} p_0 \\ p_1 \end{bmatrix} \quad \text{[Equation 25]}$$

The equation 25 corresponds to the codebook mentioned earlier in the equation 11 represented by a weighted matrix $$\left(\begin{bmatrix} 1 & 1 \\ 1 & -1 \end{bmatrix}\right).$$

In the equation 25, each element of a first column $[1\ 1]^T$ corresponds to a weight of a basic precoder $p_0$ (second precoder) constructing w[0] according to time. Similarly, each element of a second column $[1\ -1]^T$ corresponds to a weight of a second precoder $p_1$ according to time. A base station and a UE determine the $[1\ 1]^T$ and the $[1\ -1]^T$ as a beam ID of the $p_0$ and a beam ID of the $p_1$, respectively. In other word, each column constructing a codebook (i.e., a weighted matrix), which is applied to transmit a synchronization signal, is used as a beam ID for identifying each beam in a beam scanning procedure. In particular, since the base station is able to forward a beam ID to the UE via a weighted matrix, the base station is able to forward a beam ID for the beam scanning procedure to the UE without additional signaling.

Similarly, when the number of repeatedly transmitting a synchronization signal corresponds to 4, equation 26 is explained.

$$\begin{bmatrix} w[0] \\ w[1] \\ w[2] \\ w[3] \end{bmatrix} = \sqrt{\frac{P}{4}} \left( \begin{bmatrix} 1 & 1 & 1 & 1 \\ 1 & 1 & -1 & -1 \\ 1 & -1 & 1 & -1 \\ 1 & -1 & -1 & 1 \end{bmatrix} \otimes I_{N_T} \right) \begin{bmatrix} p_0 \\ p_1 \\ p_2 \\ p_3 \end{bmatrix} \quad \text{[Equation 26]}$$

The equation 26 corresponds to a codebook represented again using a weighted matrix when a repetition count of a synchronization signal corresponds to 4. Similar to the case of the equation 25, $1^{st}$, $2^{nd}$, $3^{rd}$ and $4^{th}$ columns of a weighted matrix are defined as beam IDs of $p_0$, $p_1$, $p_2$, $p_3$, respectively.

In the following, a procedure for a UE to perform beam scanning is explained in detail according to a proposed embodiment. In FIG. 21, for example, assume a case that a synchronization signal repetition count corresponds to 4 and the equation 26 is applied.

According to the embodiments mentioned earlier in FIGS. 8 to 12, as shown in FIG. 21, each beam is transmitted during 4 time slots within a sector. Referring to FIG. 21, unlike FIG. 19, 4 beams are transmitted at the same time in each time slot and a sign of a sequence varies according to a time slot. And, in FIG. 21, beams transmitted to each of regions belonging to a sector respectively correspond to $p_0$, $p_1$, $p_2$, $p_3$ from the top to the bottom. In particular, a beam transmitted to the topmost region corresponds to $p_0$ and a beam transmitted to the bottommost region corresponds to $p_3$.

If a synchronization signal is transmitted according to FIG. 21, a UE performs synchronization according to equation 27 described in the following and estimates a timing synchronization and a sequence (cell ID) of the synchronization signal. Unlike the equation 24, a beam scanning procedure for estimating a beam ID is not performed with a synchronization procedure at the same time in the equation 27.

$$\{\hat{t}_0, \hat{i}\} = \underset{\tilde{t}_0, \tilde{i}}{\arg\max} \left[ |(s_{\tilde{i}})^H r[\tilde{t}_0]|^2 \right] \quad \text{[Equation 27]}$$

If a UE performs synchronization only according to the equation 27, as mentioned earlier in the FIG. 22, the number of correlators of the UE is reduced to 4 from 12 of FIG. 20. If the number of correlators is reduced, since calculation complexity of the UE is considerably reduced, the aforementioned problem can be solved.

In the following, a procedure of performing beam scanning, which is performed after a UE estimates timing synchronization and a sequence, is explained.

The timing and the sequence index, which are determined according to the equation 27, are represented as $\hat{t}_o$, $\hat{i}$, respectively. And, when the $\hat{t}_o$, $\hat{i}$ are calculated, a correlation value between a reception signal and a sequence is defined as $\gamma[t]$. In this case, if there is no noise, a correlation value calculated in each time slot can be represented as equation 28 described in the following.

$$\begin{bmatrix} \gamma[0] \\ \gamma[1] \\ \gamma[2] \\ \gamma[3] \end{bmatrix} = \sqrt{\frac{P}{4}} \begin{bmatrix} 1 & 1 & 1 & 1 \\ 1 & 1 & -1 & -1 \\ 1 & -1 & 1 & -1 \\ 1 & -1 & -1 & 1 \end{bmatrix} \begin{bmatrix} h_0 \\ h_1 \\ h_2 \\ h_3 \end{bmatrix} \quad \text{[Equation 28]}$$

where $\gamma[n] \triangleq s_{\hat{i}}^H r[\hat{t}_n]$, $h[n] = p_n^T g$

The UE performs a beam scanning procedure based on the equation 28. First of all, if both sides of the equation 28 are multiplied by an inverse matrix, it may obtain equation 29 described in the following.

$$\begin{bmatrix} 1 & 1 & 1 & 1 \\ 1 & 1 & -1 & -1 \\ 1 & -1 & 1 & -1 \\ 1 & -1 & -1 & 1 \end{bmatrix} \begin{bmatrix} \gamma[0] \\ \gamma[1] \\ \gamma[2] \\ \gamma[3] \end{bmatrix} = \sqrt{4P} \begin{bmatrix} h_0 \\ h_1 \\ h_2 \\ h_3 \end{bmatrix} \quad \text{[Equation 29]}$$

If a matrix calculation is performed on the equation 29, a result can be represented by equation 30 described in the following.

$$\begin{bmatrix} |\gamma[0] + \gamma[1] + \gamma[2] + \gamma[3]|^2 \\ |\gamma[0] + \gamma[1] - \gamma[2] - \gamma[3]|^2 \\ |\gamma[0] - \gamma[1] + \gamma[2] - \gamma[3]|^2 \\ |\gamma[0] - \gamma[1] - \gamma[2] + \gamma[3]|^2 \end{bmatrix} = \begin{bmatrix} 4P|h_0|^2 \\ 4P|h_1|^2 \\ 4P|h_2|^2 \\ 4P|h_3|^2 \end{bmatrix} \quad \text{[Equation 30]}$$

A UE compares 4 power values obtained according to equation 30 and selects a biggest value from among the 4 power values. For example, if a value of $|\gamma[0]+\gamma[1]+\gamma[2]+\gamma[3]|^2$ corresponding to an element of a first row corresponds to a biggest value, the UE may comprehend it as $|h_0=p_0^T g|^2$ is greater than $|h_n=p_n^T g|^2$, n=2,3,4. In particular, the UE is able to know that a beam of a first region generated by $p_0$ is received with stronger power compared to beams of other regions.

In other word, the UE is able to know that the UE is positioned at a first region within a sector. This is because the UE knows that the value of $|\gamma[0]+\gamma[1]+\gamma[2]+\gamma[3]|^2$ corresponds to a value calculated using a first raw [1 1 1 1] of a weight matrix and the $p_0$ is mapped to the [1 1 1 1] since the codebook is shared between the base station and the UE. In particular, since the UE is already knows a beam ID mapped to a column selected from the weight matrix, the UE can perform a beam scanning procedure by calculating the weight matrix without separately receiving a beam ID.

As a different example, if a value of an element $|\gamma[0]-\gamma[1]-\gamma[2]+\gamma[3]|^2$ corresponds to a biggest value in the equation 30, the UE is able to know that a value of $|h_3=p_3^T g|^2$ is the biggest. In particular, in FIG. 21, the UE is able to know that a beam of the last region generated by $p_3$ is received with greater power compared to beams of other regions. Hence, the UE is able to know that a position of the UE within a sector corresponds to the last region corresponding to the $p_3$.

According to the aforementioned procedure, although the base station does not separately generate and assign a beam ID for the beam scanning procedure, the UE can distinguish beams from each other using a weight matrix of a repeatedly received synchronization signal (i.e., the beam scanning procedure can be performed).

According to the aforementioned embodiments, although a sequence for a beam ID is not newly defined in the beam scanning procedure, the UE can distinguish beams from each other. Hence, when the UE performs timing estimation, the number of sequences to be searched by the UE is reduced to the number of cell IDs and synchronization complexity of the UE is considerably reduced.

According to one embodiment, it may be able to configure columns of a weight matrix to be orthogonal to each other. Equation 25 and equation 26 show weight matrixes when a repetition count corresponds to 2 and 4, respectively. In particular, if columns of a weight matrix are configured to be orthogonal to each other, a procedure of applying an inverse matrix of a weight matrix can be simplified in the equation 28.

If columns of a weight matrix are configured to be orthogonal to each other, it means that a vector corresponding to a weighted sum, which is applied to a basic (second) precoder in a specific time slot, is configured to be orthogonal to a vector corresponding to a weighted sum applied in a different time slot. This can also be comprehended as a codebook is designed to make each of vectors w[t] constructing a synchronization signal codebook {w[0], w[1], . . . , w[$N_R$-1]} to be orthogonal to each other. Since the vectors correspond to codes orthogonal to each other, the vectors can also be comprehended as OCC (orthogonal cover code).

In order to make each of vectors to be orthogonal to each other, a codebook can be designed using a hadamard matrix mentioned earlier in the equation 8 or a DFT matrix. The hadamard matrix can be simply generated for a random repeated number. Since values of each of elements are defined by addition and subtraction only, it may have a merit in that implementation complexity is very low. The DFT matrix can also be simply generated for a random repeated number. Values of each of elements are determined by $$e^{\frac{j2\pi n}{N}},$$

$n \in \{0, \ldots, N-1\}$ (N corresponds to a repeated number). For example, when a repeated number corresponds to 4, a DFT matrix can be generated as equation 31 described in the following.

$$\begin{bmatrix} 1 & 1 & 1 & 1 \\ 1 & -j & -1 & j \\ 1 & -1 & 1 & -1 \\ 1 & j & -1 & j \end{bmatrix} \quad \text{[Equation 31]}$$

In case of a DFT matrix, if a repeated number corresponds to 2, the DFT matrix has complexity identical to complexity of the hadamard matrix. If a repeated number is equal to or less than 4, it may be able to simply generate the DFT matrix. Although the repeated number exceeds 4, it may be able to minimize the increase of the complexity using FFT (Fast Fourier Transform).

In FIG. 23, an embodiment different from the embodiments of FIGS. 21 and 23 is explained. According to the embodiment of FIG. 23, a beam ID can be defined not only by a weight applied to a basic precoder but also by a sequence. If a channel is quickly changed while a synchronization signal is repeatedly transmitted according to the embodiments mentioned earlier in FIGS. 21 and 22, performance of beam scanning can be deteriorated. In order to minimize the performance deterioration, the embodiment shown in FIG. 23 proposes a method of generating a beam ID in consideration of a sequence in addition to a weight matrix.

Referring to FIGS. 23(a) and (b), a base station transmits $p_0$, $p_1$ at the same time during two contiguous time slots. Referring to FIGS. 23(c) and (d), the base station transmits $p_2$, $p_3$ at the same time during two contiguous time slots.

In this case, in order to make the $p_0$, $p_1$ to be distinguished from each other, weights applied to the $p_0$, $p_1$ are defined by $[1\ 1]^T$ and $[1\ -1]^T$, respectively. Similarly, in order to make the $p_2$, $p_3$ to be distinguished from each other, weights applied to the $p_2$, $p_3$ are defined by $[1\ 1]^T$ and $[1\ -1]^T$, respectively. In this case, a UE can distinguish the $p_0$, $p_1$ from the $p_2$, $p_3$ via the procedures mentioned earlier in the equations 28 to 30.

Meanwhile, in order to distinguish the $p_0$, $p_1$ transmitted in the first two time slots from the $p_2$, $p_3$ transmitted in a next two time slots, the base station allocates a sequence $s_i$ in the first two time slots (FIGS. 23(c) and (d)) and allocates a sequence $s_j$, $j \neq i$ in the next two time slots (FIGS. 23(c) and (d)). In this case, since a sequence is additionally allocated to distinguish two regions positioned at the top from two regions positioned at the bottom within a section, the number of correlators of the UE increases as many as the additional sequence.

According to the embodiment mentioned earlier in FIG. 23, since a section of which a channel should not be changed is reduced to two time slots, it becomes a scheme robust to a rapid change of a channel.

Figure 24:
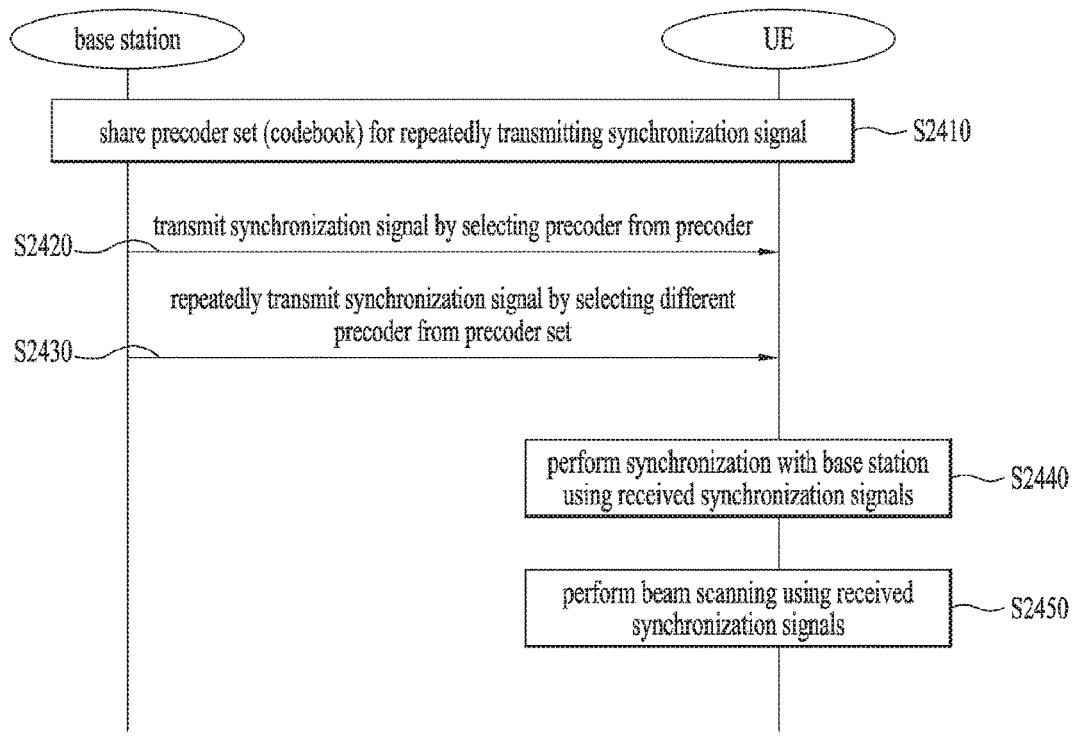
FIG. 24 is a flowchart for a synchronization procedure and a beam scanning procedure according to a further different embodiment.

FIG. 24 is a flowchart for a synchronization procedure and a beam scanning procedure according to a further different embodiment. In FIG. 24, the aforementioned embodiments are explained according to a time flow. In particular, although it is not explicitly described in FIG. 24, the contents mentioned earlier in FIGS. 19 to 23 can be identically or similarly applied.

First of all, a base station and a UE share a precoder set (i.e., a codebook) for repeatedly transmitting a synchronization signal [S2410]. The codebook can include third precoders configured by weighted sums of second precoders. A weighted sum is differently applied to each of the second precoders. In this case, each of weighted sum vectors (i.e., OCC) for generating the third precoders included in the precoder set can be configured to be orthogonal to each other. Meanwhile, as mentioned earlier in FIG. 12, the codebook can be transmitted to the UE in a manner of being generated by the base station. Or, the UE may directly generate the codebook. In this case, as mentioned in the foregoing description, a weighted sum applied to each of the third precoders indicates a beam ID of the base station.

Subsequently, the base station transmits a synchronization signal by selecting one from among third precoders constructing the precoder set (codebook) [S2420]. A precoder can be randomly selected from among the third precoders included in the precoder set as a third precoder applied to the synchronization signal. Subsequently, the base station selects a different third precoder from the precoder set (codebook) in a next OFDM symbol and repeatedly transmits the synchronization signal [S2430]. In the step S2430, a third precoder rather than the precoder selected in the step S2420 is selected from the precoder set. In FIG. 24, it is assumed a case that the number of repeatedly transmitting the synchronization signal corresponds to 2. If the repetition count is higher, the step S2430 can be repeatedly performed.

The UE performs synchronization with the base station using the repeatedly received synchronization signal [S2440]. This step can be comprehended as a step of estimating a best value by calculating a correlation between timing of the synchronization signal received by the UE and a sequence. When the UE calculates the correlation, the step S2440 may apply an embodiment of storing median values in a stack and retrieving the values according to the embodiments mentioned earlier in FIGS. 10 and 11.

If timing and a sequence are estimated in every time slot in the step S2440 and synchronization is completed, the UE performs a beam scanning procedure using the synchronization signals received in the steps S2420 and S2430 [S2450]. In particular, the UE performs the procedures mentioned earlier in the equations 28 to 30 on a correlation value obtained by performing synchronization in every time slot. Hence, the UE is able to determine a beam received with strongest power among a plurality of beams. The UE is able to identify a position (i.e., subsector) of the UE within a sector via the beam scanning procedure.

If the base station introduces OCC to a codebook through the aforementioned procedure, the base station can make the UE perform beam scanning without allocating an additional sequence for the beam scanning to the UE. Hence, the UE can minimize the increase of complexity for implementing the beam scanning procedure.

5. Apparatus Configuration

Figure 25:
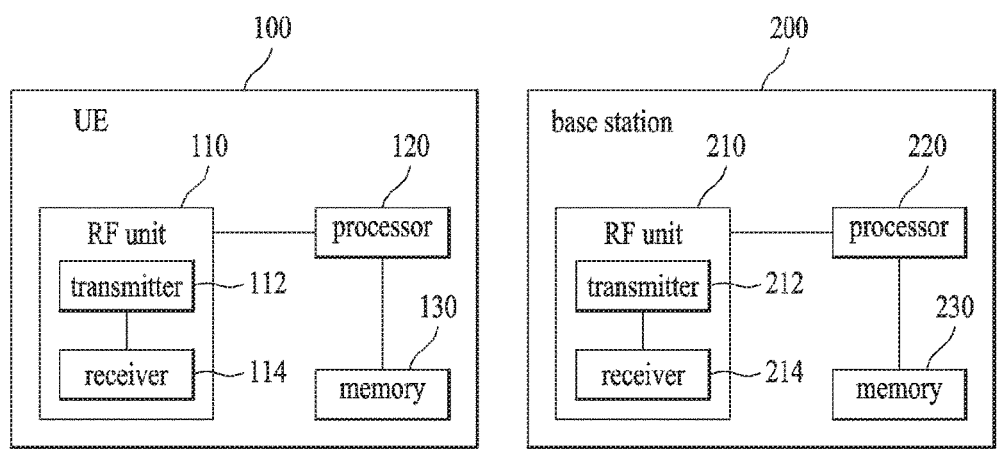
FIG. 25 is a diagram illustrating configurations of a UE and a base station related to a proposed embodiment.

FIG. 25 is a block diagram showing the configuration of a user equipment and a base station according to one embodiment of the present invention. In FIG. 25, the user equipment 100 and the base station 200 may include radio frequency (RF) units 110 and 210, processors 120 and 220 and memories 130 and 230, respectively. Although a 1:1 communication environment between the user equipment 100 and the base station 200 is shown in FIG. 25, a communication environment may be established between a plurality of user equipment and the base station. In addition, the base station 200 shown in FIG. 25 is applicable to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other user equipments and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the user equipment 100 may perform the methods of the various embodiments of the present invention.

The transmitter 212 and the receiver 214 of the base station 200 are configured to transmit and receive signals to and from another base station and user equipments and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the user equipment 100 and the base station 200 instruct (for example, control, adjust, or manage) the operations of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof.

If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method may be implemented as programs executable in computers and executed in general computers that operate the programs using computer readable media. In addition, data used in the aforementioned method may be recorded in computer readable recording media through various means. It should be understood that program storage devices that can be used to describe storage devices including computer code executable to perform various methods of the present invention do not include temporary objects such as carrier waves or signals. The computer readable media include storage media such as magnetic recording media (e.g. ROM, floppy disk and hard disk) and optical reading media (e.g. CD-ROM and DVD).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The aforementioned method of performing beam scanning can be applied to various wireless communication systems including IEEE 802.16x and 802.11x systems in addition to 3GPP LTE and LTE-A system. Moreover, the method can also be applied to mmWave communication system using an ultrahigh frequency band.

What is claimed is:

1. A method of performing beam scanning, which is performed by a base station with a user equipment (UE) in a wireless communication system, the method comprising:
generating each of N first precoders based on weighted sums of N second precoders,
wherein N is an integer larger than 1,
wherein each of the N first precoders is determined based on corresponding weighted sum vector for the N second precoders,
wherein the corresponding weighted sum vector for each of the N first precoders is composed of elements having a value of +1 or −1, and
wherein the N second precoders corresponds to different subsector, respectively; and
transmitting, to the UE, N synchronization signals determined based on the N first precoders,
wherein each of the N synchronization signals is transmitted over corresponding time intervals,
wherein the N synchronization signals are used for a synchronization procedure, a beam scanning procedure, and a cell ID acquisition procedure of the UE, and
wherein the corresponding weighted sum vector for each of the N first precoders corresponds to a beam ID utilized for the beam scanning procedure.

2. The method of claim 1, wherein the weighted sum vectors are orthogonal to each other.

3. The method of claim 2, wherein the weighted sum vectors are generated based on a Hadamard matrix.

4. The method of claim 1, wherein a codebook comprising the N first precoders is shared between the base station and the UE.

5. The method of claim 1, wherein the beam scanning procedure is performed using a correlation value calculated in the synchronization procedure.

6. The method of claim 5, wherein the beam scanning procedure is performed while a sequence for beam scanning is not separately allocated.

7. A base station performing beam scanning with a user equipment (UE) in a wireless communication system, the base station comprising:
a transmitter;
a receiver; and
a processor configured to operate in a manner of being connected with the transmitter and the receiver,
wherein the processor configured to:
generate each of N first precoders based on weighted sums of N second precoders,
wherein N is an integer larger than 1,
wherein each of the N first precoders is determined based on corresponding weighted sum vector for the N second precoders,
wherein the corresponding weighted sum vector for each of the N first precoders is composed of elements having a value of +1 or −1, and
wherein the N second precoders corresponds to different subsector, respectively; and
transmit N synchronization signals determined based on the N first precoders,
wherein each of the N synchronization signals is transmitted over corresponding time intervals,
wherein the N synchronization signals are used for a synchronization procedure, a beam scanning procedure, and a cell ID acquisition procedure of the UE, and
wherein the corresponding weighted sum vector for each of the N first precoders corresponds to a beam ID utilized for the beam scanning procedure.

8. The base station of claim 7, wherein the weighted sum vectors are orthogonal to each other.

9. The base station of claim 8, wherein the weighted sum vectors are generated based on a Hadamard matrix.

10. The base station of claim 7, wherein a codebook comprising the N first precoders is shared between the base station and the UE.

11. The base station of claim 7, wherein the beam scanning procedure is performed using a correlation value calculated in the synchronization procedure.

12. The base station of claim 11, wherein the beam scanning procedure is performed while a sequence for beam scanning is not separately allocated.

* * * * *